(12) United States Patent
Yoo et al.

(10) Patent No.: US 11,176,392 B2
(45) Date of Patent: Nov. 16, 2021

(54) LIVENESS TEST METHOD AND APPARATUS

(71) Applicant: Samsung Electronics Co., Ltd., Suwon-si (KR)

(72) Inventors: Byungin Yoo, Seoul (KR); Jingtao Xu, Beijing (CN); Chao Zhang, Beijing (CN); Hao Feng, Beijing (CN); Yanhu Shan, Beijing (CN); Youngjun Kwak, Seoul (KR); Youngsung Kim, Suwon-si (KR); Wonsuk Chang, Hwaseong-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 590 days.

(21) Appl. No.: 15/886,875

(22) Filed: Feb. 2, 2018

(65) Prior Publication Data

US 2018/0276488 A1 Sep. 27, 2018

(30) Foreign Application Priority Data

Mar. 27, 2017 (KR) ........................ 10-2017-0038347

(51) Int. Cl.
*G06K 9/00* (2006.01)
(52) U.S. Cl.
CPC ..... *G06K 9/00906* (2013.01); *G06K 9/00228* (2013.01); *G06K 9/00275* (2013.01); *G06K 9/00288* (2013.01)
(58) Field of Classification Search
CPC ........... G06K 9/00275; G06K 9/00906; G06K 9/00228; G06K 9/00288
See application file for complete search history.

(56) References Cited

U.S. PATENT DOCUMENTS

| 8,064,688 B2 | 11/2011 | Schneiderman |
| 9,367,729 B2 | 6/2016 | Schuckers et al. |

(Continued)

FOREIGN PATENT DOCUMENTS

| CN | 104755018 A | 7/2015 |
| CN | 105389554 A | 3/2016 |

(Continued)

OTHER PUBLICATIONS

Edmunds, Taiamiti, and Alice Caplier. "Motion-based countermeasure against photo and video spoofing attacks in face recognition." Journal of Visual Communication and Image Representation 50 (2018): 314-332. (Year: 2018).*

(Continued)

*Primary Examiner* — Pinalben Patel
(74) *Attorney, Agent, or Firm* — NSIP Law

(57) ABSTRACT

A liveness test method and apparatus is disclosed. The liveness test method includes detecting a face region in an input image for a test target, implementing a first liveness test to determine a first liveness value based on a first image corresponding to the detected face region, implementing a second liveness test to determine a second liveness value based on a second image corresponding to a partial face region of the detected face region, implementing a third liveness test to determine a third liveness value based on an entirety of the input image or a full region of the input image that includes the detected face region and a region beyond the detected face region, and determining a result of the liveness test based on the first liveness value, the second liveness value, and the third liveness value.

37 Claims, 10 Drawing Sheets

(56) References Cited

U.S. PATENT DOCUMENTS

| | | |
|---|---|---|
| 2014/0270412 A1 | 9/2014 | Ma et al. |
| 2015/0003692 A1* | 1/2015 | Cavallini ............... G06K 9/629 |
| | | 382/118 |
| 2015/0154392 A1 | 6/2015 | Bao et al. |
| 2016/0063235 A1* | 3/2016 | Tussy ................. G06Q 20/3276 |
| | | 726/6 |
| 2016/0335483 A1* | 11/2016 | Pfursich ............. G06K 9/00899 |
| 2016/0335515 A1 | 11/2016 | Juveneton et al. |
| 2017/0323167 A1* | 11/2017 | Mapen ............... G06K 9/00604 |

FOREIGN PATENT DOCUMENTS

| | | |
|---|---|---|
| CN | 105956572 A | 9/2016 |
| EP | 0 526 197 A2 | 2/1993 |
| KR | 10-2014-0001164 A | 1/2014 |
| KR | 10-2015-0069799 A | 6/2015 |
| KR | 10-2015-0128510 A | 11/2015 |
| KR | 10-1606351 B1 | 3/2016 |
| KR | 10-2017-0006355 A | 1/2017 |
| WO | WO 2016/197297 A1 | 12/2016 |
| WO | WO 2017/025573 A1 | 2/2017 |
| WO | WO 2017/025575 A1 | 2/2017 |

OTHER PUBLICATIONS

Das, Abhijit. "Towards multi-modal sclera and iris biometric recognition with adaptive liveness detection." Ph. D. dissertation (2017). (Year: 2017).*

Partial European Search Report dated Jul. 5, 2018 in corresponding European Application No. 18163142.5 (14 pages in English).

Chakka, M et al., "Competition on Counter Measures to 2-D Facial Spoofing Attacks", *Proceedings of International Joint Conference on Biometrics (IJCB)*, Oct. 2011, pp. 1-6 (6 pages in English).

Kim, G et al., "Face Liveness Detection Based on Texture and Frequency Analyses", *Proceedings of the 5th IAPR International Conference on Biometrics (ICB)*, Mar. 2012, pp. 67-72 (6 pages in English).

Extended European Search Report dated Nov. 16, 2018 in European Patent Application No. 18163142.5 (19 pages in English).

Korean Office Action dated Jul. 28, 2021 in counterpart Korean Patent Appication No. 10-2017-0038347 (12 pages in English, 10 pages in Korean).

* cited by examiner

LIVENESS TEST METHOD AND APPARATUS

CROSS-REFERENCE TO RELATED APPLICATION(S)

This application claims the benefit under 35 USC § 119(a) of Korean Patent Application No. 10-2017-0038347 filed on Mar. 27, 2017, in the Korean Intellectual Property Office, the entire disclosure of which is incorporated herein by reference for all purposes.

BACKGROUND

1. Field

The following description relates to a liveness test method and apparatus for performing a liveness test on an object to determine whether the object is live.

2. Description of Related Art

In a user verification system, a computing apparatus may determine whether to allow access to the computing apparatus based on verification information provided by a user. The verification information may include a password or biometric information that is input by the user. The biometric information may include information associated with a fingerprint, an iris, or a face of the user.

Recently, face anti-spoofing technology is attracting growing interest as a security method for the user verification system, where face spoofing may be a type of attack using, for example, an image, a video, or a mask, and thus, it may be important to distinguish such a type of attack in the facial verification. The face anti-spoofing technology may be used to determine whether a face of a user input to the computing apparatus is a fake face or a genuine face. The face anti-spoofing technology may include extracting features, such as, for example, a local binary pattern (LBP), a histogram of oriented gradients (HOG), and a difference of Gaussians (DoG), and determining whether the input face is fake or genuine based on the extracted features. However, such current approaches may have relatively low accuracies for liveness detections, and thus, computing apparatuses that perform the user verification may be too easily spoofed and resulting in unpermitted access to the computing apparatus.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a processor implemented liveness test method includes detecting a face region in an input image for a test target, implementing a first liveness test to determine a first liveness value based on a first image corresponding to the detected face region, implementing a second liveness test to determine a second liveness value based on a second image corresponding to a partial face region of the detected face region, implementing a third liveness test to determine a third liveness value based on an entirety of the input image or a full region of the input image that includes the detected face region and a region beyond the detected face region, and determining a result of the liveness test based on the first liveness value, the second liveness value, and the third liveness value.

The first liveness value may be based on extracted face shape information, extracted in the first liveness test, from the first image, the second liveness value may be based on extracted texture information, extracted in the second liveness test, from the second image, and/or the third liveness value may be based on extracted context information, extracted in the third liveness test, from the input image or the full region of the input image.

The determining of the result of the liveness test may include determining a final liveness value based on the first liveness value, the second liveness value, and the third liveness value, and determining whether the test target is live based on whether the final liveness value satisfies a preset condition.

The determining of the final liveness value may include applying respective weights to at least one of the first liveness value, the second liveness value, or the third liveness value, and determining the final liveness value based on a result of the applying.

The respective weights may be determined based on at least one of a determined size of the detected face region, a determined facial pose depicted in the input image, a determined location of a face in the input image, a determined presence or absence of an occluded region in the detected face region, or a determined illumination state of the detected face region.

The respective weights may be based on respective predetermined functions that differently consider one or more of the determined size of the detected face region, the determined facial pose depicted in the input image, the determined location of the face in the input image, the determined presence or absence of the occluded region in the detected face region, and the determined illumination state of the detected face region.

The determining of the final liveness value may include at least one of, in response to the first liveness value being determined to be less than a first threshold value, applying a first weight to the first liveness value and performing the determining of the result of the liveness test based on the applying of the first weight to the first liveness value, in response to the second liveness value being determined to be less than a second threshold value, applying a second weight to the second liveness value and performing the determining of the result of the liveness test based on the applying of the second weight to the second liveness value, or in response to the third liveness value being determined to be less than a third threshold value, applying a third weight to the third liveness value and performing the determining of the result of the liveness test based on the applying of the third weight to the third liveness value.

The first liveness value may be determined by the first liveness test being implemented by a first liveness test model, the second liveness value may be determined by the second liveness test being implemented by a second liveness test model, and the third liveness value may be determined by the third liveness test being implemented by a third liveness test model.

The method may further include implementing a single liveness test model to perform the first liveness test, the second liveness test, and the third liveness test.

Image information of the first image, image information of the second image, and image information of the input image or the full region of the input image may be input to at least one input layer of the liveness test model, and the first liveness value, the second liveness value, and the third liveness value may be output from at least one output layer of the liveness test model.

The method may further include selectively implementing the first liveness test, the second liveness test, and/or the second liveness test.

The selective implementing may include, in response to a size of the detected face region being determined to be less than a threshold face region size, determining not to implement the first liveness test, the second liveness test, and the second liveness test.

The method may further include normalizing the first image, and implementing the first liveness test by determining the first liveness value from image information of the normalized first image using a first liveness test model.

The method may further include obtaining the second image by cropping the partial face region from the detected face region, and implementing the second liveness test by determining the second liveness value from image information of the second image using a second liveness test model.

The obtaining of the second image may include randomly determining a region to be cropped within the detected face region and performing the cropping with respect to the determined region to be cropped.

The method may further include normalizing the input image or the full region of the input image, and implementing the third liveness test by determining the third liveness value from image information of the normalized input image using a third liveness test model.

The determining of the first liveness value may be performed using a trained first liveness test model, the first liveness test model being trained to extract face shape information from an input face region and to determine the first liveness value based on the extracted face shape information, the determining of the second liveness value may be performed using a trained second liveness test model, the second liveness test model being trained to extract texture information from an input partial face region, and/or the determining of the third liveness value may be performed using a trained third liveness test model, the third liveness test model being trained to extract context information from an input face included image.

The first liveness test model may be trained to extract features representing a light reflection and/or shape distortion that occurs due to respective bent or wrinkled portions of one or more spoofing materials.

The second liveness test model may be trained to extract features representing fine texture differences between human skin and one or more potential materials.

The third liveness test model may be trained to extract features indicating a depth of a spoofing material and/or an object or human extremity holding the spoofing material.

In one general aspect, provided is a non-transitory computer-readable storage medium storing instructions, which when executed by computing hardware, cause the computing hardware to perform one or more or all operations described herein.

In one general aspect, a processor implemented liveness test method includes detecting a face region from an input image for a test target, implementing a first liveness test to determine a first liveness value based on a first image corresponding to the detected face region, implementing a second liveness test to determine a second liveness value based on a second image corresponding to a partial face region of the detected face region, implementing a third liveness test to determine a third liveness value based on an entirety of the input image or a full region of the input image that includes the detected face region and a region beyond the detected face region, and determining a result of the liveness test based on at least one of the first liveness value, the second liveness value, or the third liveness value.

The determining of the result of the liveness test may include determining a final liveness value based on at least one of the first liveness value, the second liveness value, or the third liveness value, and determining whether the test target is live based on whether the final liveness value satisfies a preset condition.

The first liveness value may be determined by the first liveness test being implemented by a first liveness test model, the second liveness value may be determined by the second liveness test being implemented by a second liveness test model, and the third liveness value may be determined by the third liveness test being implemented by a third liveness test model.

In one general aspect, a processor implemented liveness test method includes detecting a face region from an input image for a test target, implementing a first liveness test to determine a first liveness value based on the detected face region or a partial face region of the detected face region, implementing a second liveness test to determine a second liveness value based on an entirety of the input image or a full region of the input image that includes the detected face region and a region beyond the detected face region, and determining a result of the liveness test based on the first liveness value and the second liveness value.

The determining of the result of the liveness test may include determining a final liveness value based on the first liveness value and the second liveness value, and determining whether the test target is live based on whether the final liveness value satisfies a preset condition.

The determining of the final liveness value may include applying respective weights to at least one of the first liveness value or the second liveness value, and determining the final liveness value based on a result of the applying.

In one general aspect, a liveness test apparatus to perform a liveness test on a test target includes a processor configured to detect a face region from an input image, implement a first liveness test to determine a first liveness value based on a first image corresponding to the detected face region, implement a second liveness test to determine a second liveness value based on a second image corresponding to a partial face region of the detected face region, implement a third liveness test to determine a third liveness value based on an entirety of the input image or a full region of the input image that includes the detected face region and a region beyond the detected face region, and determine a result of the liveness test based on the first liveness value, the second liveness value, and the third liveness value.

The processor may be configured to determine a final liveness value based on the first liveness value, the second liveness value, and the third liveness value, and determine whether the test target is live based on whether the final liveness value satisfies a preset condition.

The processor may be configured to apply respective weights to at least one of the first liveness value, the second liveness value, or the third liveness value, and determine the final liveness value based on a result of the applying.

In one general aspect, a liveness test apparatus to perform a liveness test on a test target includes a processor configured to implement a trained first liveness test model input a first image corresponding to a detected face region of an input image, the first liveness test model being trained to extract face shape information from an input face region and to determine a first liveness value based on the extracted face shape information, implement a trained second liveness test model input a second image corresponding to a partial face region of the detected face region, the second liveness test model being trained to extract texture information from an input partial face region and to determine a second liveness value based on the extracted texture information, implement a trained third liveness test model input an entirety of the input image or a full region of the input image that includes the detected face region and a region beyond the detected face region, the third liveness test model being trained to extract context information from an input face included image and to determine a third liveness value based on the extracted context information, and determine a liveness of the input image based on the first liveness value as determined by the first liveness test model, the second liveness value as determined by the second liveness test model, and the third liveness value as determined by the third liveness test model.

The first liveness test model may be trained to extract features representing a light reflection and/or shape distortion that occurs due to respective bent or wrinkled portions of one or more spoofing materials.

The second liveness test model may be trained to extract features representing fine texture differences between human skin and one or more spoofing materials.

The third liveness test model may be trained to extract features indicating a depth of a spoofing material and/or an object or human extremity holding the spoofing material.

The apparatus may further include a first weight determiner configured to determine respective first weights to be applied to one or more of the first liveness value, the second liveness value, and the third liveness value based on respective determinations of whether the first liveness value, the second liveness value, and the third liveness value meet respective first, second, and third liveness thresholds, and/or a second weight determiner configured to determine respective second weights to be applied to one or more of the first liveness value, the second liveness value, and the third liveness value based on one or more determined conditions regarding the detected face region, where the determining of the liveness of the input image may be based on the first weight to be applied to the first liveness value being applied to the first liveness value and/or the second weight to be applied to the first liveness value being applied to the first liveness value, based on the first weight to be applied to the second liveness value being applied to the second liveness value and/or the second weight to be applied to the second liveness value being applied to the second liveness value, and the first weight to be applied to the third liveness value being applied to the third liveness value and/or the second weight to be applied to the third liveness value being applied to the third liveness value, to determine a final liveness value which the liveness of the input image is based on.

The one or more determined conditions regarding the detected face region may include a determined distance to the test target, a determined image quality, a determined size of the detected face region, a determined facial pose depicted in the input image, a determined location of the detected face region in the input image, a determined presence or absence of an occluded region in the detected face region, and a determined illumination state of the detected face region.

The apparatus may further include a memory including respective trained parameters of first liveness test model, the second liveness test model, and the third liveness test model, where first liveness test model, the second liveness test model, and the third liveness test model may be respective one or more neural network layers, and where the processor may be configured to be a unified neural network by implementing the respective trained parameters to generate the respective one or more neural network layers in the unified neural network.

The unified neural network may further include one or more further neural network layers trained to perform the determining of the liveness of the input image based on the first liveness value, the second liveness value, and the third liveness value, as provided to the one or more further neural network layers.

At least two of the first liveness test model, the second liveness test model, and the third liveness test model may be configured to be implemented in parallel with two of the first liveness test model, the second liveness test model, and the third liveness test model being configured to be implemented in serial.

The first liveness test model, the second liveness test model, and the third liveness test model may be configured to be implemented in parallel, with each of the a first image, the second image, and the entirety of the input image or the full region of the input image being input to corresponding separate input layers of the unified neural network.

Other features and aspects will be apparent from the following detailed description, the drawings, and the claims.

Figure 1:
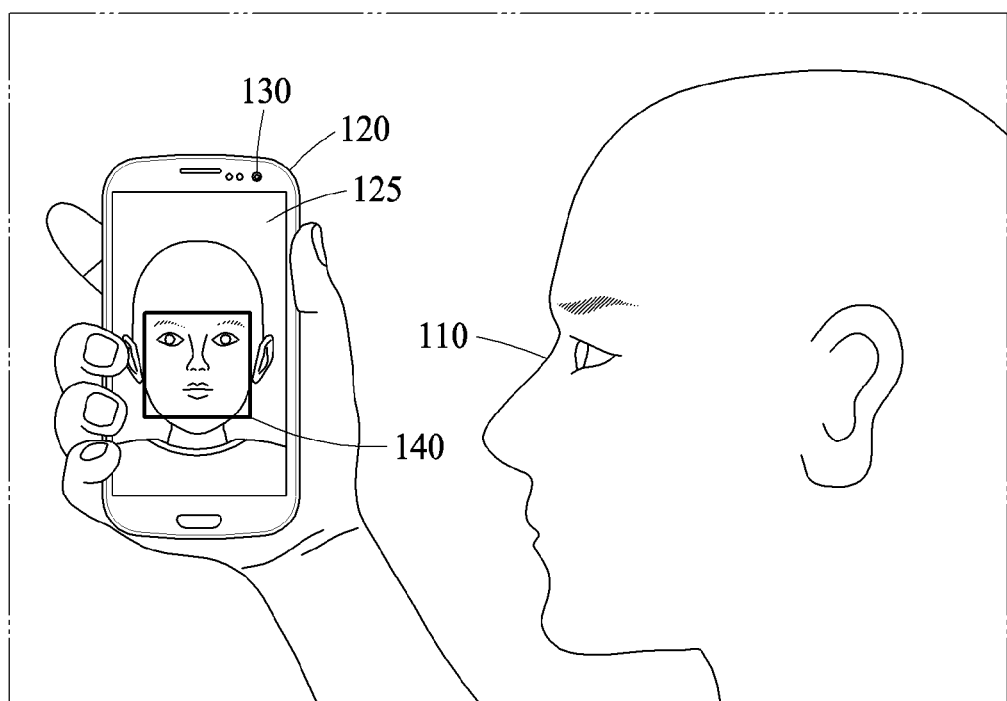
FIG. 1 is a diagram illustrating an example of a liveness test.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," "including," "has," and/or "having" when used herein, specify the presence of stated features, integers, operations, elements, components, or combinations/groups thereof in an example embodiment, but do not preclude the presence or addition of one or more other features, integers, operations, elements, components, and/or combinations/ groups thereof in alternative embodiments, nor the lack of such stated features, integers, operations, elements, components, and/or combinations/groups in further alternative embodiments unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of a liveness test.

A liveness test may be performed to determine whether an object, which is a test target, is live or not. For example, the liveness test may be performed to determine whether a face in an image captured by a camera is a genuine face or a fake face. Here, the term "liveness" is used to distinguish between a lifeless object, for example, a photograph, an image, and a replica as a fake means, and a live object, for example, a live human being. In one example, the liveness test may be used to determine whether a target for a user verification further performed for user log-in, payment services, access control, and the like is live or not. In addition, the liveness test may be used to prevent an undesirable result of the verification, for example, a false rejection or a false acceptance by detecting an attempt at the verification, for example, a spoofing attack made using a substitute, such as, for example, an image, a video, a mask, a replica, and the like.

Referring to FIG. 1, a liveness test apparatus may be included in, or represented by, a computing apparatus 120. In examples, such as the computing apparatus 120, the liveness test apparatus 700 of FIG. 7, and computing apparatus 800 of FIG. 8, each of which herein can individually and collectively be referred to as respective liveness test apparatuses, each liveness test apparatus includes one or more processors configured to perform two or more distinct liveness test operations, for example, as well as face verification based on one or more verification images and results of the liveness test operations, thus output a verification result. For example, upon determination of a liveness of an input image, the liveness test apparatus may then perform face verification, or may incorporate results of the liveness test into the face verification operations. The computing apparatus 120 may be, for example, a smartphone, a wearable device, a tablet computer, a netbook, a laptop computer, a desktop computer, a personal digital assistant (PDA), a set-top box, a home appliance, a biometric door lock, a security device, or a vehicle start device.

As noted, in one example, the computing apparatus 120 performs a user verification on a user 110 attempting to have access to the computing apparatus 120 through a facial verification. For example, in a case in which the user 110 attempts at the user verification to cancel a lock state of the computing apparatus 120, the computing apparatus 120 obtains a face image of the user 110 using an image acquirer, for example, a camera 130, analyzes the obtained face image, and determines whether to cancel the lock state of the computing apparatus 120.

The user 110 captures an image of a face of the user 110 using the camera 130 to cancel the lock state of the computing apparatus 120. Here, an invalid user may attempt to cancel the lock state by causing an undesirable result of the verification, for example, a false rejection or a false acceptance, in the computing apparatus 120 using a spoofing technique. For example, the invalid user presents, to the camera 130, a photograph on which a face of a valid user is printed or a replica of a face shape of the valid user to cause the undesirable result of the verification. The liveness test apparatus may thus be used to prevent such an undesirable result from occurring due to the spoofing technique. In an example, the result of the liveness test or the face verification may also be provided through the display 125 of the computing apparatus 120.

In one example, in a case in which the liveness test apparatus determines that the test target is live, or the test target is genuine, the computing apparatus 120 performs the user verification. In response to a result of the user verification being determined to be successful, the computing apparatus 120 cancels the lock state of the computing apparatus 120 and enables the user to gain access to further capabilities or functions of the computing apparatus, e.g., through the display 125. Conversely, in response to the result of the user verification being determined to be unsuccessful, the computing apparatus 120 may not permit the user 110 to cancel the lock state of the computing apparatus 120, and the computing apparatus 120 will control itself to continue to operate in the lock state. In a case in which the liveness test apparatus determines that the test target is not live, or the test target is fake, the computing apparatus 120 may not proceed to a next stage to perform the user verification and continues to operate in the lock state. In another example, the lock state may not be removed until the liveness test and verification operations are both successful and the user is determined to be alive valid user of the computing apparatus 120. In addition, in additional embodiments, the liveness test and/or verification operations may additionally or alternatively be performed to control or indicate to an external device to permit entry of a user to a restricted area due to the liveness test results, or based on results of both the liveness test results and the face verification, or may similarly selectively authorize financial or payment transactions to proceed or be initiated, as well as alternative operations or processes depending on embodiment.

The liveness test apparatus may perform the liveness test based on various factors that are detected from an image captured by the camera 130. For example, the liveness test apparatus determines whether the test target is live based on context information, overall face shape information, and partial face texture information of the captured image. An image captured when the test target is located far from the camera may include a clue to a determination of whether the test target is a display of an electronic device or a paper. For example, examples take into consideration the case in which an image includes a hand of a user holding an electronic device or a paper, the image may be used as a clue to a determination that the test target is fake. Using this example context information in examples, such a spoofing attempt may be detected effectively. In addition, using the overall face shape information in examples, a light reflection and a shape distortion may be considered in examples to determine a result of the liveness test. For example, a light reflection in a photograph or a paper, which is a spoofing means, is used as a clue to a determination that a face is not a genuine face of a human being in examples, and a shape distortion that occurs due to a bent or wrinkled portion of the photograph or the paper may be determined in examples. Based on such factors, the liveness test may be performed in differing examples. In addition, using the texture information in examples, a fine texture difference between human skin and the paper or the display of the electronic device may be detected. Thus, based on such various factors in combination in examples, whether the test target is live or not may be determined more accurately than previous approaches.

Figure 2A:
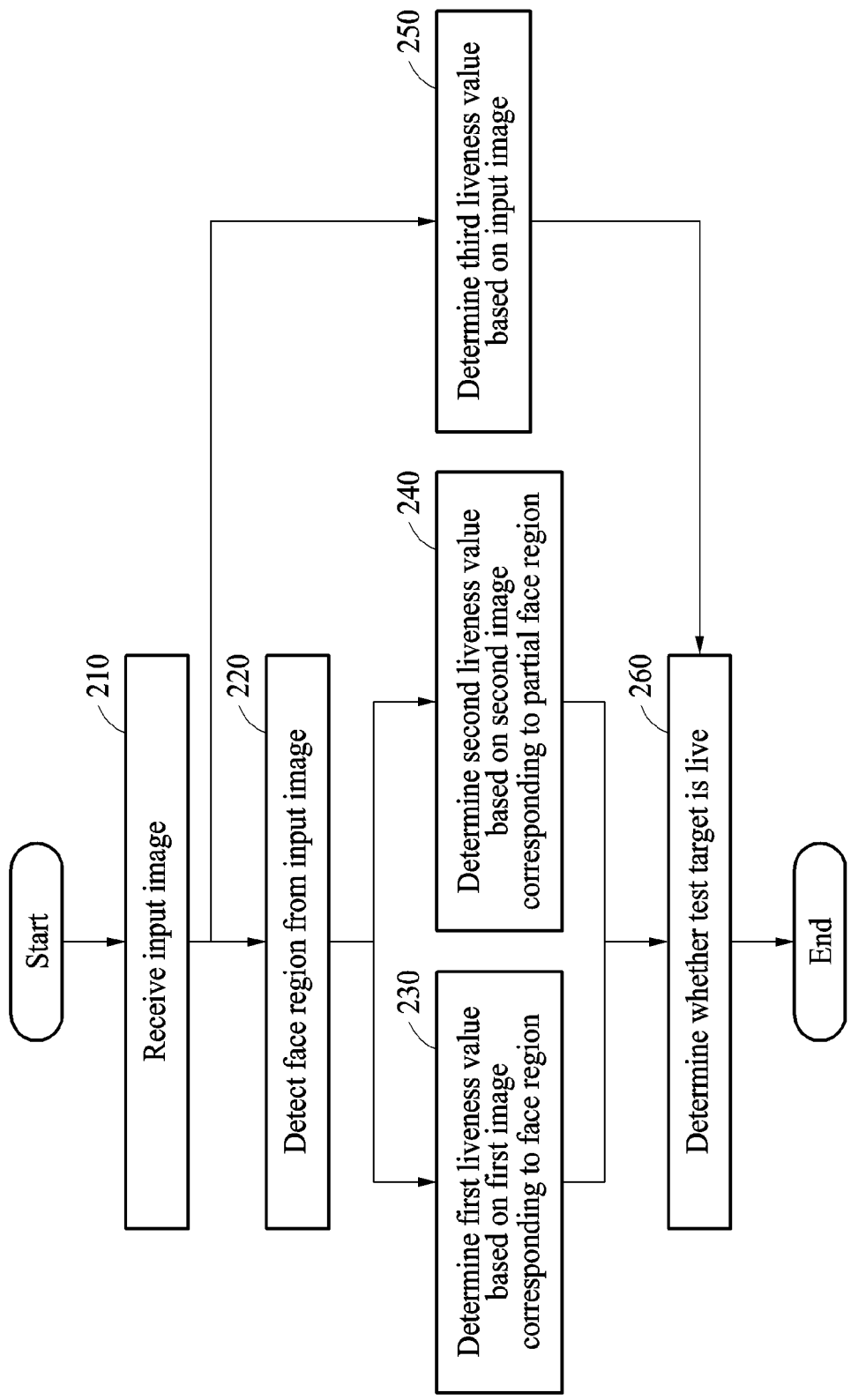
FIG. 2A is a flowchart illustrating an example of a liveness test method.

FIG. 2A is a flowchart illustrating an example of a liveness test method.

Referring to FIG. 2A, in operation 210, a liveness test apparatus receives an input image. The input image refers to an image input to the liveness test apparatus, which is a test target for a liveness test. The input image may be obtained by an image acquirer, for example, a digital still camera and a video camera. One or more processors of the liveness test apparatus may be configured to perform image preprocessing on the received input image. For example, the image preprocessing may include one or more or any combination of operations to process the input image to be more suitable for the liveness test. The image preprocessing may include an operation of adjusting a size of the input image, an operation of rotating the input image, an operation of removing noise from the input image, an operation of increasing a contrast of the input image, an operation of deblurring the input image, an operation of removing a background region, an operation of warping a distortion included in the input image to correct the distortion, an operation of cropping a region from the input image, and/or an operation of performing binarization on the input image, as only examples. Hereinafter, regardless of whether such image preprocessing is performed, references to an "input image" may be understood to refer to the input image on which image preprocessing has been performed when the preprocessing is performed in an example and understood to refer to the input image without image preprocessing when the preprocessing is not performed in an example.

In operation 220, the liveness test apparatus detects a face region from the input image. For example, the liveness test apparatus detects the face region from the input image using a Haar-based cascade adaboost classifier or a Viola-Jones detector. However, a scope of examples is not limited to the example described in the foregoing, and the liveness test apparatus may detect the face region from the input image using various face region detection methods. For example, the liveness test apparatus detects facial landmarks from the input image and detects, as the face region, a bounding region including the detected facial landmarks. The liveness test apparatus may detect the landmarks of the face from the face region using a landmark detecting scheme based on, for example, an active contour model (ACM), an active shape model (ASM), an active appearance model (AAM), a supervised descent method (SDM), as only examples.

To perform the liveness test, the liveness test apparatus uses a liveness test neural network. The liveness test neural network refers to a neural network that is trained to implement a liveness model to provide information, for example, a probability value and a feature value, that may be determinative of, or be used to determine, whether an object is live based on information input to the liveness test neural network. The liveness model's provided feature value (or respective feature values of one or more respective liveness test models discussed herein) may also each be a resultant feature vector, which can be compared to a predefined multi-dimensional vector space where multi-dimensional vectors of live object are predetermined to be distributed differently in the multi-dimensional space than multi-dimensional vectors of face objects, for example. As discussed below, the liveness test neural network may be trained in advance, such as by the liveness test apparatus or a server or another computing apparatus or system, through supervised learning based on training data. The liveness test neural network may perform a nonlinear mapping, and thus have a great ability to distinguish between a fake object and a genuine object in the liveness test.

For example, herein, the liveness test neural network includes a plurality of layers, and each of the layers includes a plurality of nodes, and is implemented by one or more processors of the liveness test apparatus. For example, there may be an input layer, at least one hidden layer, and an output layer. When plural hidden levels exist the neural network may be considered a deep neural network (DNN). Depending on the architecture of the neural network, nodes included in neighboring layers may be selectively connected according to respective trained connection weights. For example, the neural network may be implemented by such a processor, i.e., the one or more processors of the liveness test apparatus, configured to generate a neural network structure/architecture with such a plurality of layers each including plural nodes and configured to apply such weighted connections between neighboring nodes in neighboring layers of the neural network structure to interpret input data applied to the neural network structure. As only examples, herein such an 'interpretation' of input data may include a performed feature extraction, recognition, verification, or rejection, such as for the example liveness determinations and further image recognition or verification by the liveness test apparatus or computing apparatuses herein, as well as any other trained objective(s) of the respective layers, collection of layers, and/or whole neural network. Thus, based on the training data and desired interpretation objective(s), the architecture, selective connections between neighboring nodes, and corresponding connection weights may be varied during training until the neural network is trained to a desired acceptability for the desired interpretation objective(s). For example, in examples where the neural network is trained for feature extraction or interpretation for the liveness test operations described herein, as well as further trained for the image verification or rejection by the liveness test apparatuses and computing apparatuses described herein, the neural network may include convolutional layers or be representative of a convolutional neural network (CNN), and thus the respective convolutional connection weights, e.g., for varying feature extractions through feature kernels, may be trained to an original desired acceptability for feature extraction, liveness determination, and face verification, rejection, or identification operations, such as performed by the computing apparatus 120 of FIG. 1, liveness test apparatus 700 of FIG. 7, and the computing apparatus 800 of FIG. 8. The neural network may also be of a different type of neural network, e.g., other than the CNN, and merely include one or more convolutional layers, e.g., for selective feature extraction, and the different type of neural network may be trained and configured for further objectives. Returning to the training of the neural network, the resultant connection weights of the trained neuro network may be referred to as parameters of the neural network, e.g., demonstrated as at least trained kernel values of a convolutional layer or operation of the example CNN. For example, the neural network may be trained based on the labeled input image information or desired corresponding output images, classifications, or geometric parameters, such as through a loss considering backpropagation or simulated annealing algorithms. For example, the neural network may be trained to extract features of training data. Thus, in the training, connection weightings between nodes of different hidden layers or kernels of convolutional layers are recursively adjusted until the corresponding neural network model is trained with a desired accuracy rate or below a maximum error rate, for example. The trained neuro network may be stored in a memory of the liveness test apparatus, for example, in any of the liveness test/computing apparatuses discussed herein. In examples, the trained neural network may be stored in trained vectors, a matrix or matrices, or other formats, e.g., where elements of the vectors, matrices, or other formats represent or suggest the corresponding trained parameters as weighted connections or kernels, as only examples, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, deconvolutional, or pooling layers, as only examples. The hyper-parameters may further include information of the configuration and values of any bias and/or contextual nodes in the neural network, corresponding activation functions of the nodes, types of nodes, such as long short-term memory nodes, and define any or any further recurrent structures of the neural network, which may vary depending on embodiment and interpretation objective of the trained neural network.

Accordingly, before or during operations of FIGS. 2A-6, as only examples, the verifying apparatus may acquire such trained parameters to be specially configured using the acquired trained parameters as the one or more trained liveness test neural networks to perform the corresponding described operations to perform one or more or all operations of FIGS. 2A-6, based upon input of respective images and to output results determinative of liveness of, or used to determine, whether the input image is a live image. In addition, in an example, the liveness test neural networks may further be trained and configured to include recurrent connections, and thus, trained to further consider a sequence of plural images input to the liveness test neural network to determine a liveness of one or more of the input images.

The one or more of the liveness test neural network operations referred herein in FIGS. 2A-6, or other liveness test machine learning implementations of such operations, may also be implemented only through a specially configured hardware module or implemented through hardware and instructions stored in/on non-transitory media, e.g., of or exterior to the liveness test apparatus, that, when executed by one or more processors of the hardware, for example, cause the processor to implement any, any combination, or all of the operations described herein.

Thus, as only an example, the liveness test neural network is a deep convolutional neural network (DCNN). The DCNN may include one or more convolution layers, one or more pooling layers, and one or more fully connected or dense layers, and provide information that is determinative of, or to be used to determine, liveness from image information input to the liveness test neural network through operations respectively performed by each layer of the DCNN. The image information may refer to a pixel value of each pixel included in an image, for example, a color value and a brightness value, though embodiments are not limited thereto. The DCNN is provided merely as only an example of the respective implementations of the operations of FIGS. 2A-6, for example, and thus the liveness test neural network may implement another neural network model having a structure different from that of the DCNN model or alternatively an example other machine learning model other than the example neural network.

In addition, returning to FIGS. 2A and 2B and as only examples, for each of the following described operations 230, 240, and 250, the liveness test apparatus may determine a respective liveness value corresponding to each image input to corresponding separate portions/levels of the liveness test neural network, or separate liveness test neural networks. Further, operations 210, 220, and 260 may also be implemented by a unified liveness test neural network that may have at least three such example separate liveness test neural network portions/levels trained to perform the operations 230, 240, and 250, respectively. For example, while the received input image may be provided to a neural network portion/level trained to perform operation 250, the received input image may also be provided to one or more layers trained to detect the face region of operation 220 before being forwarded to respective parallel arranged neural network portions/levels trained to perform operations 230 and 240. In such an example, results of the respective operations 230, 240, and 250 may be input to an example same subsequent layer or neural network portion/level having for example one or more fully connected or dense layers trained to perform the operation 260, output results of which may be the discussed output of operation 260. In such an example, instead of output first through third liveness values, the respective network portions/levels to perform operations 230 through 250 may each output feature vectors or maps to the example subsequent layer. In another example, the example two or more of the at least three such separate liveness test neural network portions/levels may be configured in series, such as corresponding to the discussion of FIG. 2B below, and also followed by such one or more fully connected or dense layers to output the described final liveness result. Thus, each of the respective liveness test operations of operations 230-250 of FIG. 2A and operations 270-280 of FIG. 2B, and each of the respective liveness test models of liveness test models 340-360 of FIGS. 3A and 6, and liveness test model 380 of FIG. 3B may be implemented by such respective liveness test neural network portions/levels, or varied combinations of the same, as well as collectively as a unified liveness test neural network that includes all of such liveness test neural network portions/levels as well as further layers trained for any additionally trained objectives described herein. For ease of explanation, and again noting that such neural network implementations may alternatively be implemented through other machine learning approaches, the respective liveness test neural networks that implement the respective liveness determinations, such as operations 230-250 of FIG. 2A, will each be referred to hereinafter as liveness test models. Also, for ease of explanation and as only an example, the liveness value discussed below may be a reference value used to determine or to indicate whether the test target is live.

Accordingly, in operation 230, the liveness test apparatus determines a first liveness value based on a first image corresponding to the detected face region. In one example, image information of the first image is input to a first liveness test model, and the first liveness test model outputs the first liveness value corresponding to analyses of the image information of the first image by the first liveness test model. The first image may be selected and/or generated to demonstrate or include shape information associated with an overall shape of the detected face region. The first liveness value determined based on the first image may also represent a liveness determination based on considered or extracted features such as any of a light reflection and/or shape distortion of the first image. Such considered features may thus, be features that are used to detect a spoofing means. As also noted above, such example extracted features may be in the form of multi-dimensional vectors. The first liveness value may also be output as such multi-dimensional vectors corresponding to the extracted features or another multi-dimensional vector resulting from differences, combinations, and/or other considerations made of combinations of such example extracted features by the first liveness test model.

In operation 240, the liveness test apparatus determines a second liveness value based on a second image corresponding to a partial face region of the detected face region. In one example, the partial face region may be obtained by extracting, from the detected face region, a partial portion of the detected face region or a region smaller than the detected face region. In an example, the region to be extracted as the partial face region may be randomly determined or selected from within the detected face region, or a region of a size preset based on a center of the detected face region may be extracted as the partial face region. In another example, in response to a size of the detected face region being determined to fail to meet or determined to be less than or equal to a threshold face region size, the detected face region may be determined to be the partial face region, e.g., in this example if the size of the detected face fails to meet such a threshold face region size then the first image may be input to the second liveness test model and considered in operation 230.

Thus, in one example, image information of the second image is input to the second liveness test model, and the second liveness test model outputs the second liveness value corresponding to the analyses of image information of the second image by the second liveness test model. The second image may be selected and/or generated to demonstrate or include texture information of the partial face region. The second liveness value determined based on the second image may also represent a liveness determination based on considered or extracted feature(s) such as a fine texture difference, consideration of which may be used to detect a spoofing means. Similar to above, such example extracted features may be in the form of multi-dimensional vectors. The second liveness value may also be output as such multi-dimensional vectors corresponding to these extracted features or another multi-dimensional vector resulting from differences, combinations, and/or other considerations made of combinations of such example extracted features by the second liveness test model.

In operation 250, the liveness test apparatus determines a third liveness value based on the input image or a portion of the input image that includes more information than the detected face region. Thus, in one example, image information of the input image is input to a third liveness test model, and the third liveness test model outputs the third liveness value corresponding to the analyses of image information of the input image by the third liveness test model. The third liveness value determined based on the input image may also represent a liveness determination based on considered or extracted feature(s) such as a context feature, consideration of which may be used to detect a spoofing means. Similar to above, such example extracted features may also be in the form of multi-dimensional vectors. The third liveness value may also be output as such multi-dimensional vectors corresponding to these extracted features or another multi-dimensional vector resulting from differences, combinations, and/or other considerations made of combinations of such example extracted features by the third liveness test model.

Thus, with the plural example distinct feature considerations, such as by the respective first through third liveness test models, respective shape information associated with a shape of a face region, texture information of the face region or partial face region, and larger or global image context may be collectively be considered, and thus, overall liveness detection accuracies may be improved over respective single considerations of the shape or the texture of the face, and have further improved accuracies at relatively long distances and be more accurate than traditional technological approaches, and accordingly may result in more secure access control to the liveness test apparatus for example, more secure financial or payment access, and more secure area access.

In one example, as described in the foregoing, the first liveness value, the second liveness value, and the third liveness value are determined by the respective liveness test models. For example, the respective liveness test models may be arranged to operate in parallel as separate liveness test models.

In another example, the first liveness value, the second liveness value, and the third liveness value are determined by a single liveness test model. For example, the image information of the first image, the image information of the second image, and the image information of the input image are input to at least one input layer of the liveness test model, and the first liveness value, the second liveness value, and the third liveness value are output from at least one output layer of the liveness test model. In such an example, and as noted above, the respective liveness test models may be arranged in an example unified liveness test model, either in parallel or serial partial or full arrangements within the unified liveness test model, which may further include additional models, such as a neural network verification or identification neural network model represented as subsequent or parallel arranged neural network portions/levels. Such additional models may also be configured separate from the example liveness test model and merely operate based on liveness test results of the liveness test model.

In operation of 260, the liveness test apparatus determines a result of the liveness test, that is, whether the test target is live, based on the first liveness value, the second liveness value, and the third liveness value. Briefly, with the above examples regarding the separate or unified liveness test model examples, operation 260 may also be performed separate of the liveness test models, separate from an example unified liveness test model that includes two or more of the liveness test models, or combined with an example unified liveness test model that includes the example first through third liveness test models. Operation 260 may also be implemented outside of any such model approaches and thus the one or more processors of the liveness test apparatus may determine the final liveness value based on results of the respective first through third liveness values.

In one example, in operation 260 the liveness test apparatus determines a final liveness value based on all of the first liveness value, the second liveness value, and the third liveness value. For example, the liveness test apparatus determines, to be the final liveness value, a sum or a mean value of the first liveness value, the second liveness value, and the third liveness value. For another example, the liveness test apparatus applies a select weighting to at least one of the first liveness value, the second liveness value, or the third liveness value, and determines the final liveness value based on a result of applying the weight, for example, a weighted sum or a weighted average. The weight may be, for example, a preset constant, and respective weightings that may be applied to the first liveness value, the second liveness value, and the third liveness value may differ. Each of the weights may be a selected or variable conditional weight determined based on any one or any combination of conditions, for example, a determined distance to the test target, a determined image quality, a determined size of the face region, a determined facial pose depicted in the face region, a determined location of the face region, a determined presence or absence of an occluded region in the face region, and a determined illumination state of the face region, as only examples. For each of the first, second, and third liveness values, there may be plural such conditional weights applied, e.g., one for each of such determined conditions, with each such conditional weight being respectively defined based on a corresponding predetermined function for the corresponding determined condition. For example, the conditional weight for the determined distance to the test target may be based on a predetermined function, which may be linear or non-linear for setting the corresponding conditional weight dependent on the determined condition. Likewise, for each of the determined image quality, determined size of the face region, determined facial pose depicted in the face region, determined location of the face region, determined presence or absence of the occluded region(s) in the face region, and determined illumination state of the face region, corresponding linear or non-linear functions may be respectively predetermined for each condition to accordingly be used by the liveness test apparatus to set the corresponding conditional weight for each of the particular determined conditions. In an example, such weightings and/or functions may also be determined during training of the corresponding neural network(s), and/or they be set prior to training or after training, such as by a manufacturer.

In such examples, the liveness test apparatus may determine the final liveness value based on at least one of the first liveness value, the second liveness value, or the third liveness value. For example, the final liveness value is determined by the first liveness value, the second liveness value, the third liveness value, or any combination thereof.

The liveness test apparatus determines whether the test target is live based on whether the final liveness value satisfies a preset condition. For example, in response to the final liveness value satisfying the preset condition, for example, whether the final liveness value meets, or is greater than, a preset threshold value, the liveness test apparatus determines that the test target is live, that is, the test target is genuine. Conversely, in response to the final liveness value not satisfying the preset condition, the liveness test apparatus determines that the test target is not live, that is, the test target is fake. Here, in an example, any of the first through third liveness values, as well as the final liveness value, may be represented by one or more probabilistic values generated by a final layer of the respective model layers that may perform the first through third liveness test operations of operations 230 through 250. In an example, each of the first through third liveness values may be represented by one or two probabilistic output values, for example, a first that indicates the likeliness of the input image being a live image and/or a second that indicates the likeliness of the input image being a fake image. As a further example, and with respect to the below discussions of FIGS. 5 and 6, when both such first and second probabilistic output values are generated by any of the first through third liveness models, and/or generated based on consideration of any combination of such respective first through third liveness model's respectively outputting such single probabilistic value or such first and second liveness probabilistic values, the respective first and second probabilistic value may each be applied such weighting discussed with respect to FIG. 5 and/or conditional weighting discussed with respect to FIG. 6, also noting that such weightings and/or conditional weightings may be differently applied to such first and second probabilistic values. Thus, as only an example, based on the extracted features, determinations of FIG. 5, and conditional weightings of FIG. 6, it is possible that one or more certain weights may be applied to example probabilistic values that indicate that an input image is a fake image, such that a target or object may accordingly be determined to not be live when a weighted sum of such second probabilistic values is greater than a weighted sum of such first probabilistic values. In another example, if such a weighted sum of such second probabilistic values is greater a threshold value, the target or object may be determined to not be live irrespective of the weighted sum of first probabilistic values indicated that the input image is a live image.

The liveness test apparatus may accordingly determine the final liveness value based on whichever of the first through third liveness values are generated.

Figure 2B:
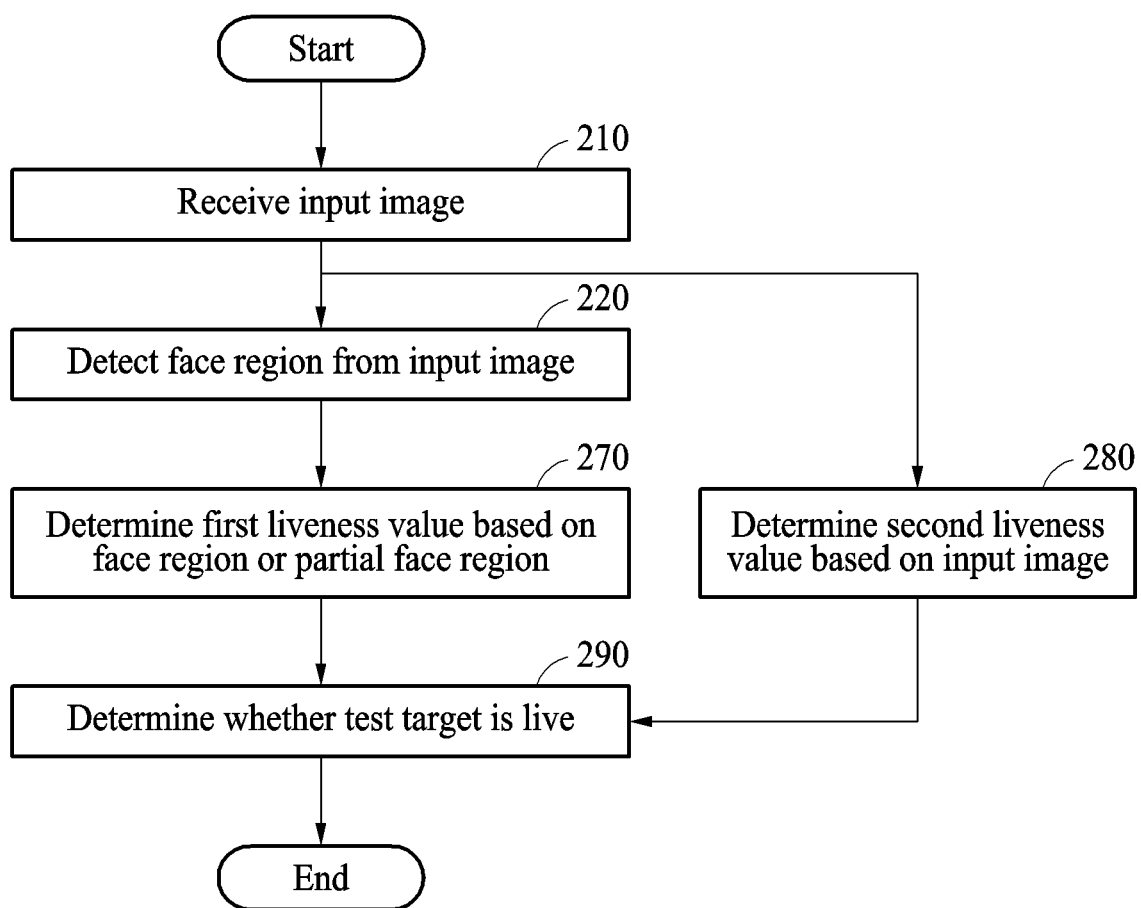
FIG. 2B is a flowchart illustrating another example of a liveness test method.

FIG. 2B is a flowchart illustrating another example of a liveness test method.

Referring to FIG. 2B, operations 210 and 220 are the same as operations 210 and 220 described above with reference to FIG. 2A, discussions of which are not repeated here for brevity. In operation 270, the liveness test apparatus determines a first liveness value based on the detected face region or the partial face region of the detected face region. In a case in which the first liveness value is determined based on the detected face region, operation 270 may include the implementations of the operations of operation 230 described above with reference to FIG. 2A, discussions of which are not repeated here for brevity. However, in a case in which the first liveness value is determined based on the partial face region, operation 270 may include the implementations of the operations of operation 240 described above with reference to FIG. 2A, discussions of which are not repeated here for brevity. The liveness test apparatus may also select between use of the detected face region and the partial face region.

In operation 280, the liveness test apparatus determines a second liveness value based on the input image. The determining of the second liveness value is the same as the determining of the third liveness value in operation 250 described above with reference to FIG. 2A, and thus a repeated description of the same is omitted here for brevity.

In operation 290, the liveness test apparatus determines whether the test target is live based on the first liveness value determined in operation 270 and the second liveness value determined in operation 280. For example, the liveness test apparatus determines a final liveness value based on the first liveness value and the second liveness value, and determines whether the test target is live based on whether the determined final liveness value satisfies a preset condition the same or similar to the description above with respect to operation 260 of FIG. 2A, discussions of which are not repeated here for brevity. Thus, according to an example, a select weighting may be applied to one or both of the first liveness value and the second liveness value, and the select weighting may be the same or different between the first liveness value and the second liveness value. Likewise, the final liveness value may be determined based on a result of the applying of the weighting, such as based on a summing or an averaging of the weighted first and second liveness values.

Figure 3A:
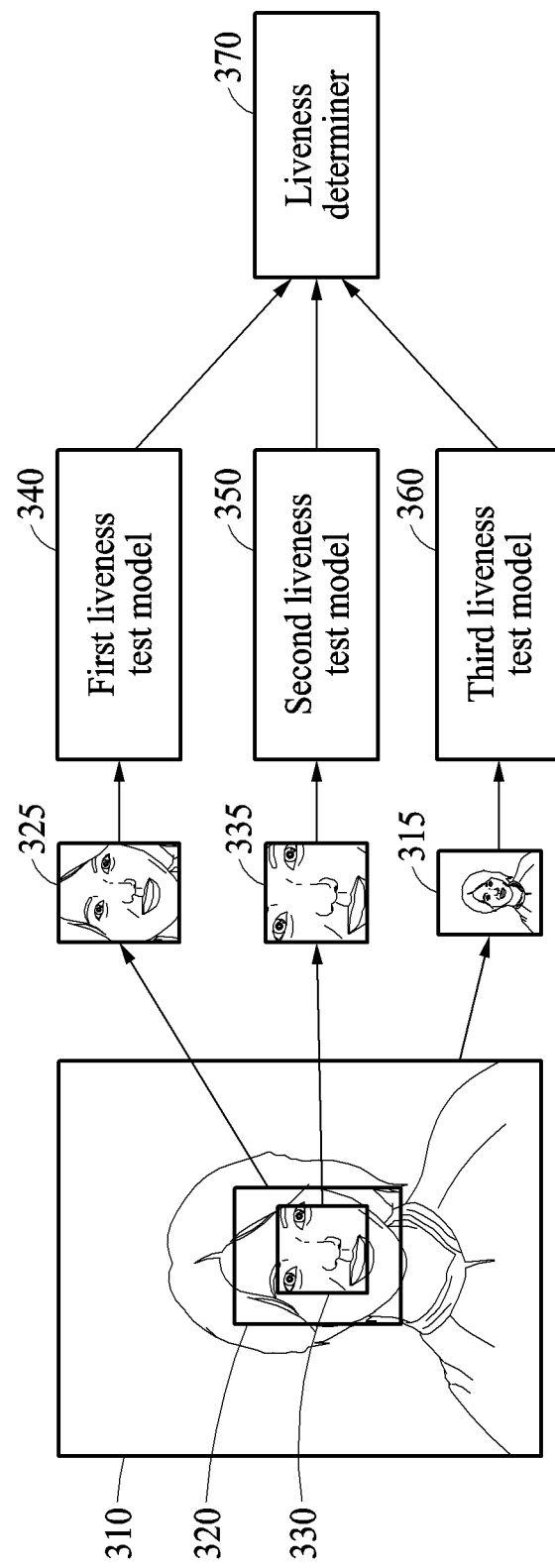
FIGS. 3A and 3B are diagrams illustrating examples of a liveness test method.
Figure 3B:
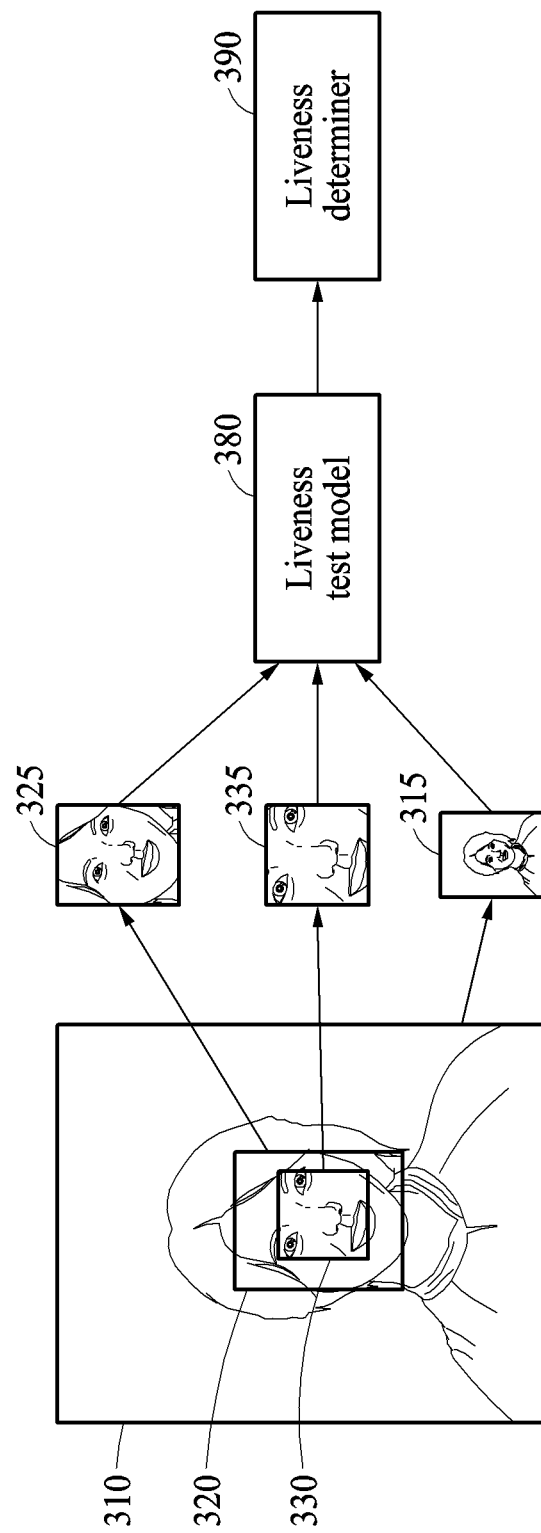

FIGS. 3A and 3B are diagrams illustrating examples of a liveness test method.

Referring to FIG. 3, an entire face region 320 is detected from an image 310 including a test target or subject, for example, and a partial face region 330 including a portion of the face region 320 is determined. Image information of a first image 325 corresponding to the face region 320 is input to a first liveness test model 340, and the first liveness test model 340 outputs a first liveness value corresponding to the first image 325. In one example, the first image 325 is an image resulting from image normalization, for example, a size adjustment and an affine transformation, performed on the face region 320. Thus, the liveness test apparatus may perform the image normalization, size adjustment, and/or affine transformation of the image 310, and generate or acquire the image information of the first image 325. Image information of a second image 335 corresponding to the partial face region 330 is input to a second liveness test model 350, and the second liveness test model 350 outputs a second liveness value corresponding to the second image 335. In one example, the second image 335 is an image resulting from an image normalization performed on the partial face region 330, for example, with the liveness test apparatus performing such normalization of the image 310 to generate or acquire the image information of the second image 335. In an example, such processing of the image 310 for the generating or acquiring of the image information of the second image 335 may not include image size adjustment, for example. For example, the second image 335 may be merely a cropped version of the image 310 with normalization, e.g., depending on whether normalization has already been performed of image 310. Image information of a third image 315 corresponding to an entire region of the image 310 is input to a third liveness test model 360, and the third liveness test model 360 outputs a third liveness value corresponding to the third image 315. The third image 315 may be the same as the image 310, or image information resulting from an image normalization performed on the image 310 to generate or acquire the image information of the third image 315. In another example, the third image 315 may be generated or acquired by such example above processings while representing more of an image region of the image 310 than in the first image 325 and less of a whole image of the image 310. Also here, while images 315, 325, and 335 are discussed as being generated or information of such images generated or acquired, embodiments are not limited thereto, as results of such normalizations, size adjustments, affine transformations, etc., may also be directly provided by the liveness test apparatus to the respective third liveness model 360, first liveness model 340, and second liveness model 350 without combination, storage, or memorizing of the respective image information as images. In addition, in the example where the liveness test models are respective liveness test neural network(s) each of the first through third liveness test models 340-360 may include, or be represented by, one or more convolutional layers, pooling or sampling, deconvolutional, and/or unsampling layers, as only examples, respectively configured according to trained parameters for the respective objectives of the first through first through third liveness test models 340-360.

A liveness determiner 370 determines a final liveness value based on the first liveness value, the second liveness value, and the third liveness value, and determines whether the test target is live based on whether the determined final liveness value satisfies a preset condition. For example, the final liveness value may be a sum, a mean value, a weighted sum, or weighted average of the first liveness value, the second liveness value, and the third liveness value. In addition, in the example where the liveness test models are respective liveness test neural network(s), the liveness determiner 370 may include, or be represented by, one or more fully connected or dense feed forward layers, as only examples, respectively configured according to trained parameters for the respective objectives of the liveness determiner 370.

The first liveness test model 340, the second liveness test model 350, and the third liveness test model 360 illustrated in FIG. 3A may be embodied in a single unified liveness test model 380 as illustrated in FIG. 3B. As illustrated in FIG. 3B, the image information of the first image 325, the image information of the second image 335, and the image information of the third image 315 are input to at least one input layer of the liveness test model 380. For example, the image information of the first image 325, the image information of the second image 335, and the image information of the third image 315 are input to different input layers of the liveness test model 380 that respectively feed subsequent parallel respective one or more layers corresponding to each of the first liveness test model 340, second liveness test model 350, and third liveness test model 360 of the unified liveness test model 380, the results of which may be respectively provided to fully connected or dense layers the liveness determiner 390, for example. In this example, the parallel respective one or more layers may each include one or more convolutional layers as well as pooling or sampling layers. In another example, the image information of the first image 325, the image information of the second image 335, and the image information of the third image 315 are input in combination to a single input layer of the liveness test model 380.

The liveness test model 380 outputs liveness values respectively corresponding to the first image 325, the second image 335, and the third image 315 based on the input image information. A liveness determiner 390 determines whether the test target is live based on the liveness values. Similar to the liveness determiner 370 of FIG. 3A, in the example where the liveness test models are respective liveness test neural network(s) or respective layers of the same, the liveness determiner 390 may include, or be represented by, one or more fully connected or dense feed forward layers, as only examples, respectively configured according to trained parameters for the respective objectives of the liveness determiner 390. In the example of a unified liveness test neural network, the respective one or more layers corresponding to the liveness determiners 370 and 390 may also be included in the respective example unified liveness test neural network.

Figure 4:
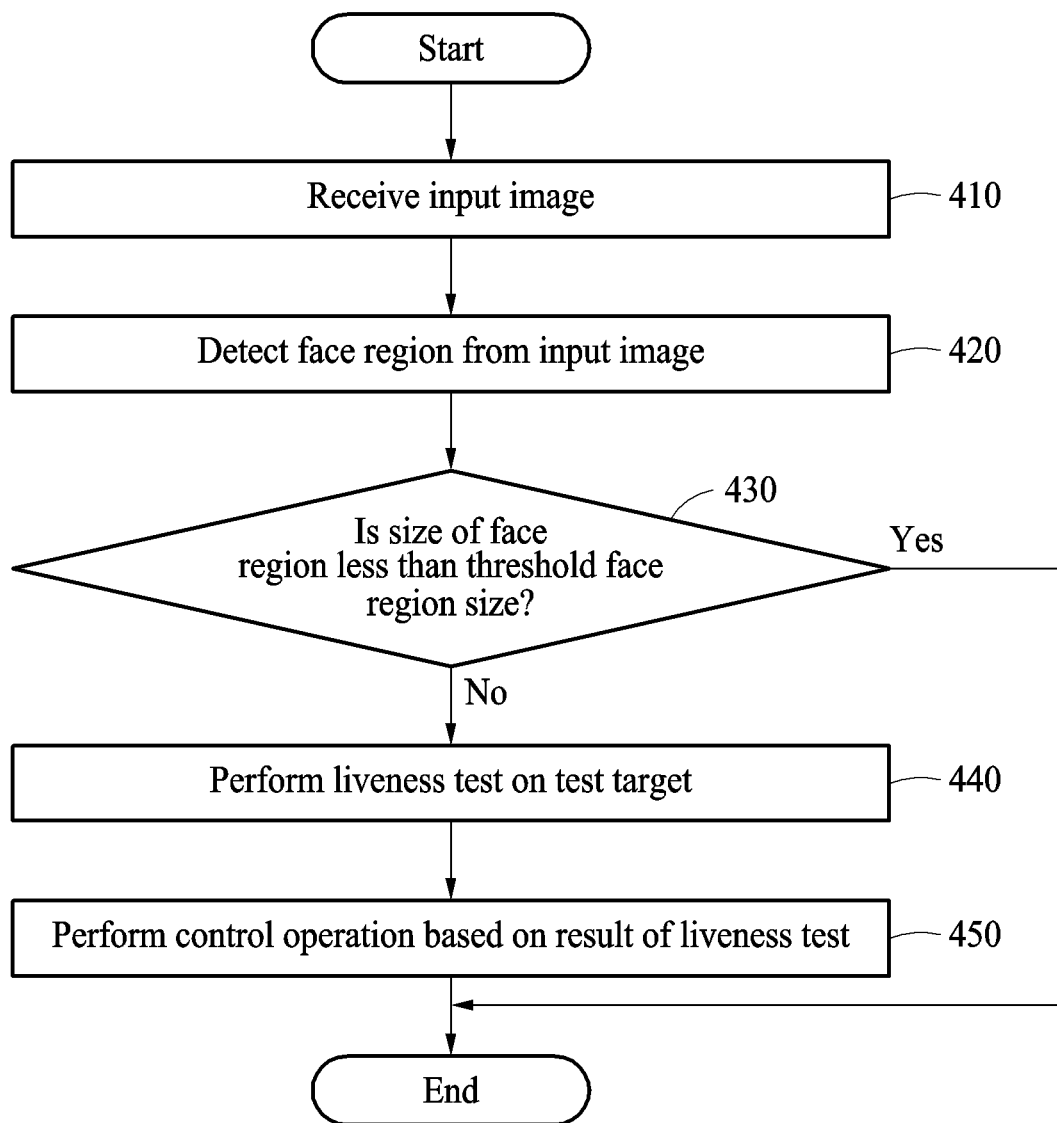
FIGS. 4 and 5 are flowcharts illustrating examples of a liveness test method.
Figure 5:
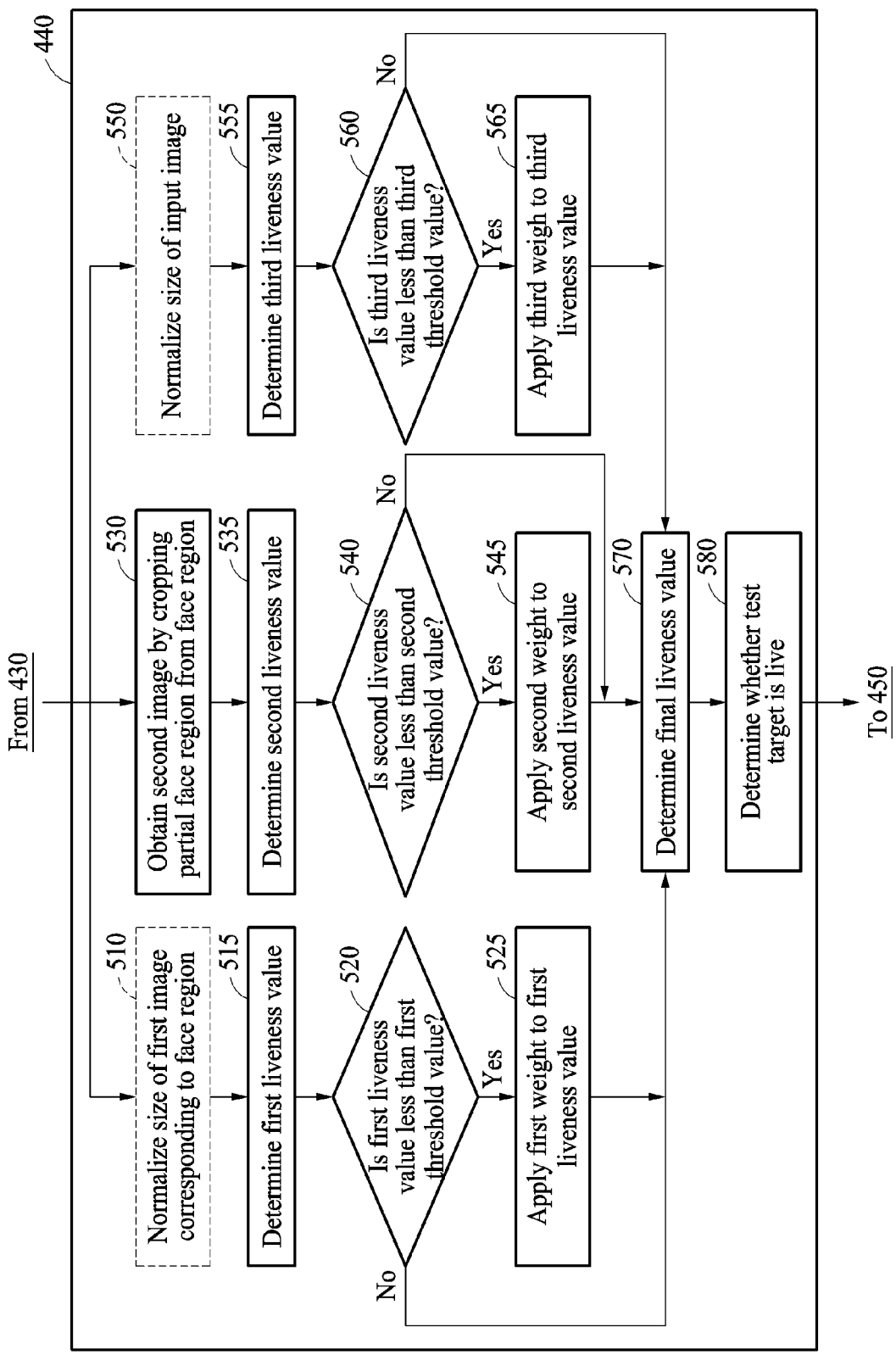

FIGS. 4 and 5 are flowcharts illustrating examples of a liveness test method.

Referring to FIG. 4, a liveness test apparatus, such as any of the liveness test apparatuses discussed herein, receives an input image including a test target in operation 410, and detects a face region from the input image in operation 420. Operations 410 and 420 described in the foregoing are the same as operations 210 and 220 described with reference to FIG. 2A, and thus a more detailed and repeated description is omitted here for brevity.

In operation 430, the liveness test apparatus determines whether a size of the detected face region fails to meet, or is less than, a threshold face region size. In response to the size of the detected face region being determined to not meet, or to be less than, the threshold face region size, the liveness test apparatus determines not to perform further liveness test operations on the test target. For example, the liveness test apparatus may determine to not forward image information about the face region to one or more or any of the aforementioned liveness test models, and may further not implement the example liveness test model or any corresponding subsequent final liveness determination based on the non-performed liveness test operations. In another example, operation 430 may not be included or may be selectively not-implemented, and thus the liveness test apparatus may merely operate similar to any of the aforementioned examples of FIGS. 2A-3B.

When operation 430 is implemented or is selectively implemented, in operation 440, and in response to the size of the detected face region not being less than the threshold face region size, the liveness test apparatus performs the liveness test on the test target, such as by implementing one or more or at least all liveness test models described above with respect to FIGS. 2A-3B and as described in greater detail below with reference to FIG. 5. In this regard, previous discussions regarding operations, elements, and components of FIGS. 2A-3B are also respectively applicable to the operations, elements, and components described with respect to FIGS. 5 and 6, so repetition of all such discussion have not been made below solely for brevity purposes.

Referring to FIG. 5, in operation 510, the liveness test apparatus normalizes a size of a first image corresponding to the detected face region. For example, an image preprocessing operation, for example, scaling, may be performed to set the size of the detected face region to be a predefined size or to control the selection of image information from the detected face region in accordance with the example predefined size. In an example, operation 510 may not be included or may be selectively implemented. In operation 515, the liveness test apparatus determines a first liveness value from image information of the normalized first image, or alternatively, the original first image, using a first liveness test model, such as discussed above with respect to FIGS. 2A-3B. In operation 520, the liveness test apparatus determines whether the first liveness value fails to meet, or is less than, a first threshold value. In operation 525, in response to the first liveness value failing to meet, or being less than, the first threshold value, the liveness test apparatus applies a first weight to the first liveness value. For example, the liveness test apparatus subtracts the first weight from the first liveness value or multiplies the first liveness value by the first weight. As an example, the application of the weight to the first liveness value may have an effect of lessening the ultimate importance or significance of the first liveness value on the final liveness value and with respect to the other determined liveness values derived in operations 535 and 555.

In operation 530, the liveness test apparatus obtains a second image by preprocessing the detected face region, such as cropping a partial face region from the detected face region. For example, a region to be cropped may be randomly determined within the detected face region, the region to be cropped may be randomly selected from within one or more further determined and/or predetermined face portions within the face region, or the region may be selected as the one or more predetermined face portions. According to an example, an image processing method, for example, scaling, may be further performed on the second image to scale a size of the second image to be a predefined size or to control the selection of image information from the second image in accordance with the example predefined size. In operation 535, the liveness test apparatus determines a second liveness value from image information of the second image using a second liveness test model, such as discussed above with respect to FIGS. 2A-3B. In operation 540, the liveness test apparatus determines whether the second liveness value fails to meet, or is less than, a second threshold value. In operation 545, in response to the second liveness value failing to meet, or being less than, the second threshold value, the liveness test apparatus applies a second weight to the second liveness value. For example, the liveness test apparatus subtracts the second weight from the second liveness value or multiples the second liveness value by the second weight. As an example, the application of the weight to the second liveness value may have an effect of lessening the ultimate importance or significance of the second liveness value on the final liveness value and with respect to the other determined liveness values derived in operations 515 and 555.

In operation 550, the liveness test apparatus normalizes a size of the input image. For example, the liveness test apparatus may implement an image preprocessing operation to adjust the size of the input image to be a predefined size or to control the selection of image information from the detected face region in accordance with the example predefined size. According to an example, operation 550 may be omitted. In operation 555, the liveness test apparatus determines a third liveness value from image information of the normalized input image, or alternatively, the original input image, using a third liveness test model, such as discussed above with respect to FIGS. 2A-3B. In operation 560, the liveness test apparatus determines whether the third liveness value is less than a third threshold value. In operation 565, in response to the third liveness value being less than the third threshold value, the liveness test apparatus applies a third weight to the third liveness value. For example, the liveness test apparatus subtracts the third weight from the third liveness value or multiples the third liveness value by the third weight. As an example, the application of the weight to the third liveness value may have an effect of lessening the ultimate importance or significance of the third liveness value on the final liveness value and with respect to the other determined liveness values derived in operations 515 and 535.

In available different examples, any one, combination, or all of the operations 525, 545, and 565 may be omitted or selectively omitted.

In operation 570, the liveness test apparatus determines a final liveness value, such as discussed above with respect to FIGS. 2A-3B. For example, the liveness test apparatus determines, to be the final liveness value, a sum, a mean value, or an averaged sum of the liveness values, for example, the first through third liveness values to which corresponding weights may or may not have been applied, e.g., depending on respective results of the corresponding threshold comparisons. One or more or all of the first through third weights may be different, and one or more or all of the first through third threshold values may be different.

In operation 580, the liveness test apparatus may determine whether the test target is live, based on the final liveness value. For example, in response to the final liveness value satisfying a preset condition, the liveness test apparatus determines that the test target is live, that is, the test target is genuine. In response to the final liveness value not satisfying the condition, the liveness test apparatus determines that the test target is not live, that is, the test target is fake. Operation 580 may further include using the result of the determination of whether the test target is live in the face recognition, verification, or rejection process of the liveness test apparatus, e.g., to control whether to initiate such recognition, verification, or rejection process or to be relied upon within the recognition, verification, or rejection process as one or multiple determiners that affect the final determination of whether the test target is recognized, verified, or rejected.

For example, referring back to FIG. 4, in operation 450, the liveness test apparatus may, thus, perform a control operation based on a result of the liveness test. In one example, in response to a determination that the test target is live, the liveness test apparatus generates a control signal to request implementation of the process for the user verification by the liveness test apparatus. Conversely, in response to a determination that the test target is not live, the liveness test apparatus generates a control signal to block access of a user without requesting the implementation of the process for the user verification or to maintain an example locked state of the liveness test apparatus without implementation of the process for the user verification, as a non-limiting example.

Figure 6:
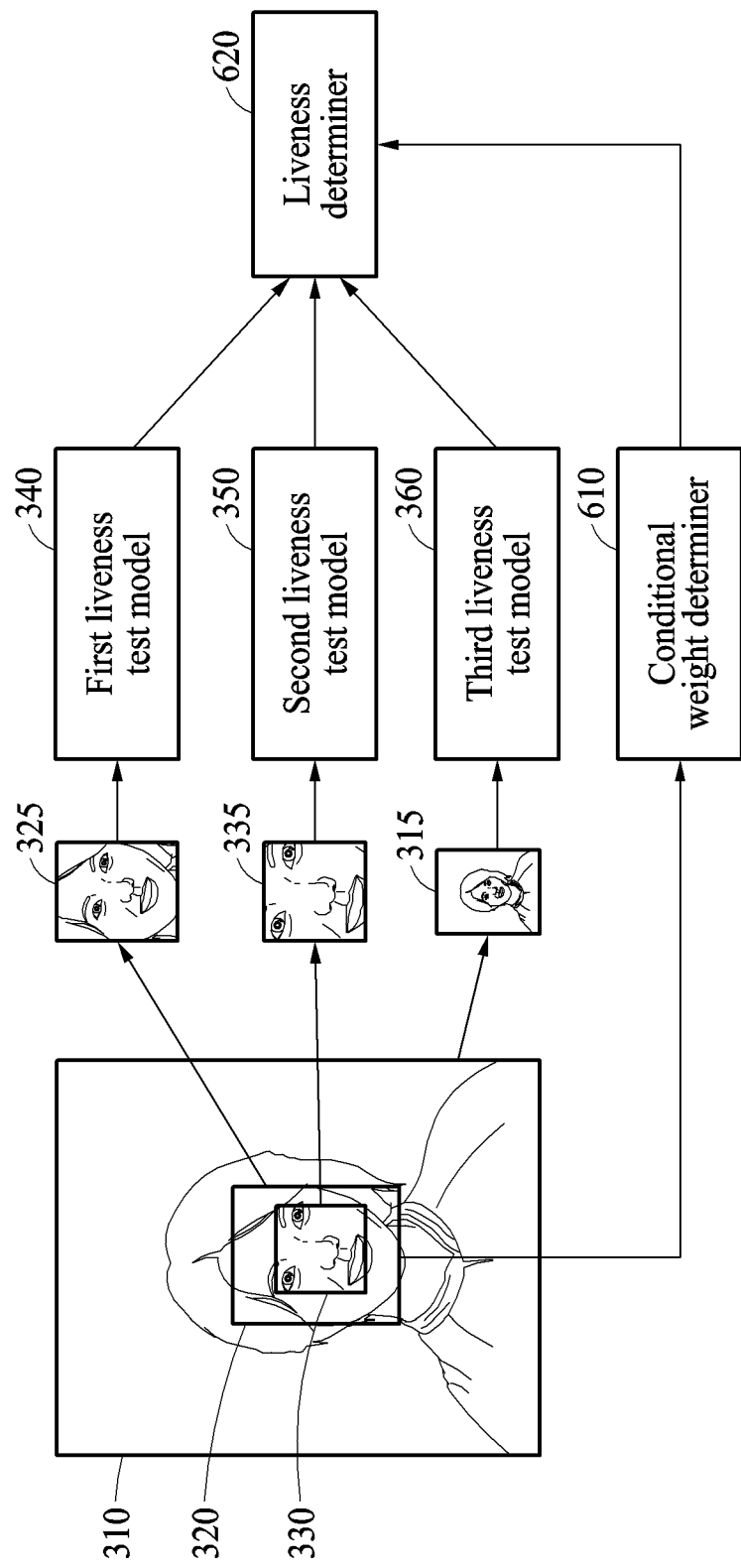
FIG. 6 is a diagram illustrating another example of a liveness test method.

FIG. 6 is a diagram illustrating another example of a liveness test method. With respect to FIG. 6, previous discussions regarding operations, elements, and components of FIGS. 2A-3B are also applicable to the operations, elements, and components described with respect to FIG. 6, so repetition of all such discussion below have not been made solely for brevity purposes.

Referring to FIG. 6, similarly to the example illustrated in FIG. 3A, a first liveness value, a second liveness value, and a third liveness value that respectively correspond to a first image 325, a second image 335, and a third image 315 may be determined using respective liveness models 340, 350, and 360. However, in addition to the example illustrated in FIG. 3A, a conditional weight determiner 610 may be used, or selectively used, to determine conditional weights to be respectively applied to one or more or all of the first liveness value, the second liveness value, and the third liveness value. The conditional weight determiner 610 determines the respective conditional weights based on a determined condition, for example, a determined distance to a test target, a determined image quality, a determined size of a face region 320, a determined facial pose depicted in the face region 320, a determined location of the face region 320, a determined presence or absence of an occluded region in the face region 320, and a determined illumination state of the face region 320, or any combination and as only examples. For example, in a case of the size of the face region 320, a relationship between the determined size of the face region 320 and any of the conditional weights may be predefined according to respective predetermined functions, each of which may be a linear or non-linear function, such as with a predetermined function for the conditional weight that may be applied to the first liveness value being non-linear or linear while either or both of the predetermined functions for the conditional weights that may be applied to the second and third liveness values being linear or non-linear functions. Here, the respective conditional weights to be applied may, thus, vary based on which one of the first liveness value, the second liveness value, and the third liveness value the respective conditional weights are to be applied to. In addition, such a relationships may also be predefined, e.g., according to such corresponding predetermined functions, for each of the different example determinable conditions, for each of the first through third liveness values, for example. As an alternative, aspects of each of one or more of the determined conditions, or a predetermined selection among such determined conditions, may be combined into a feature that can be similarly be defining of a different conditional weight based on where the feature falls along an example predetermined linear or non-linear function for defining the corresponding relationship between the combined aspects of the determined conditions and the conditional weight to be applied, again noting that such selection of which conditions will be considered may vary between the first through third liveness value applications and the corresponding predetermined functions that define the relationships between the combined aspects and the conditional weight may also vary between the first through third liveness value applications. In still another example, a single conditional weight may also be defined based on a single function for the combined aspects of all determined conditions, and that single conditional weight may be applied to all of the first through third liveness values in operation 620 as appropriate, for example.

A liveness determiner 620 determines a final liveness value based on one or more of the above example conditional weights determined by the conditional weight determiner 610 and the liveness values determined by the liveness test models 340, 350, and 360, and determines whether the test target is live based on whether the final liveness value satisfies a preset condition. In an example, the conditional weight determiner 610 applies such one or more of the above example conditional weights as corresponding to each of the liveness values. As non-limiting examples, the liveness determiner 620 may obtain the arithmetic product of a single conditional weight applied to a sum of the first through third liveness values or obtain sum of the respectively applied conditional weights to each of the first through third liveness values, and determines the final liveness value based on a result of the applying. In an example, the conditional weight determiner 610 is embodied in a neural network, or a layer or portion/level of the aforementioned unified liveness test neural network, configured/trained to receive, as an input, the example first through third liveness values, e.g., as resulting from the first through third liveness test models 340-360 and the one or more respective conditional weights, and output the final liveness value in response to the input. The example of FIG. 6 may further incorporate the operations of FIG. 5, and the liveness determiner 620 may consider all respectively applied weights discussed with respect to FIGS. 5 and 6.

Figure 7:
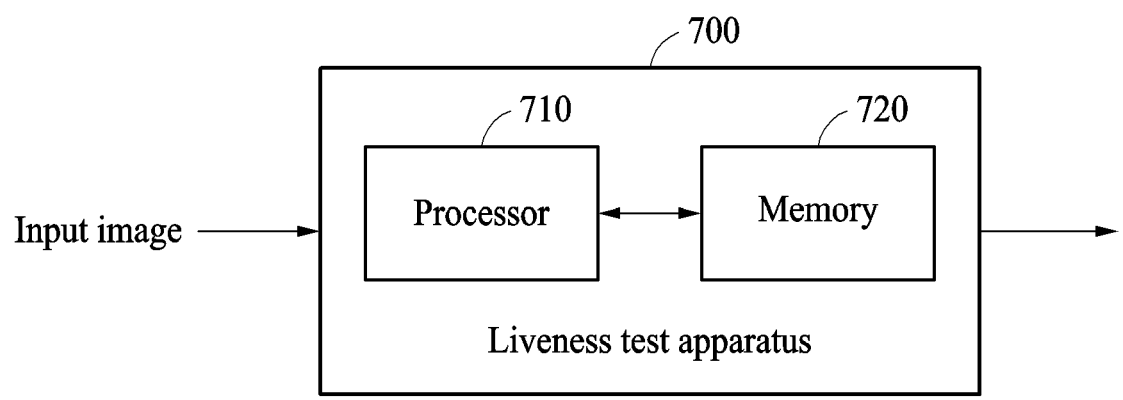
FIG. 7 is a diagram illustrating an example of a liveness test apparatus.

FIG. 7 is a diagram illustrating an example of a liveness test apparatus. A liveness test apparatus 700 may be configured to perform any one or combination or all operations described above, noting that embodiments are also not limited thereto.

Thus, the liveness test apparatus 700 may perform a liveness test on a test target included in an input image, and output a result of the liveness test or use the result of the liveness test to control whether to perform further operations of face recognition, verification, or rejection or to use the result of the liveness test within the face recognition, verification, or rejection operations for the corresponding recognitions, verifications, or rejections. The liveness test apparatus 700 may also perform one or more, any combination, or all operations illustrated or described herein with respect to the liveness test, the recognition, verification, or rejection operations, and provide the result of the liveness test to a user of the liveness test apparatus, such as through the display 125 of the liveness test apparatus 120 of FIG. 1, and/or provide the results to another terminal, such as in example embodiments where the liveness test, face recognition, verification, and/or rejection operations discussed herein are performed automatically or controlled remotely without initiation or knowledge of the target(s).

Referring to FIG. 7, the liveness test apparatus 700 includes at least one processor 710 and a memory 720. The memory 720 is a non-transitory computer readable media or device connected to the processor 710, and may store instructions, which when executed by the processor 710, cause the processor 710 to implement one or more or all operations described herein. The memory may further store data to be processed by the processor 710, or data processed by the processor 710. The memory 720 may further store trained parameters of one or more models or neural networks that, when applied, configure the processor 710 as described herein. The memory 720 may include, for example, a high-speed random access memory (RAM) and a nonvolatile computer-readable storage medium (e.g., at least one disk storage device or flash memory device, or other nonvolatile solid state memory devices).

The processor 710 may be configured to perform one or more or all operations described with reference to FIGS. 1 through 8. For example, the processor 710 may be configured to control a camera or other image sensor to capture an image, detect a face region from an input image, and determine a first liveness value based on a first image corresponding to the detected face region. The processor 710 may be configured to determine a second liveness value based on a second image corresponding to a determined partial face region of the detected face region or of another captured image, and configured to determine a third liveness value based on the captured image, the other captured image, or still a further captured image. The processor 710 may be configured to determine a final liveness value based on the first liveness value, the second liveness value, and the third liveness value, and determine whether the test target is live based on whether the final liveness value satisfies a preset condition. In one example, the processor 710 is further configured to apply a weight or one or more respective weights to one or more of the first liveness value, the second liveness value, or the third liveness value, and determines the final liveness value based on a result of applying the weight(s). The processor 710 may further be configured to acquire parameters of one or more liveness test neural network(s) or unified liveness test neural network and implement one or more or all operations described herein with respect to FIGS. 1 through 8.

Figure 8:
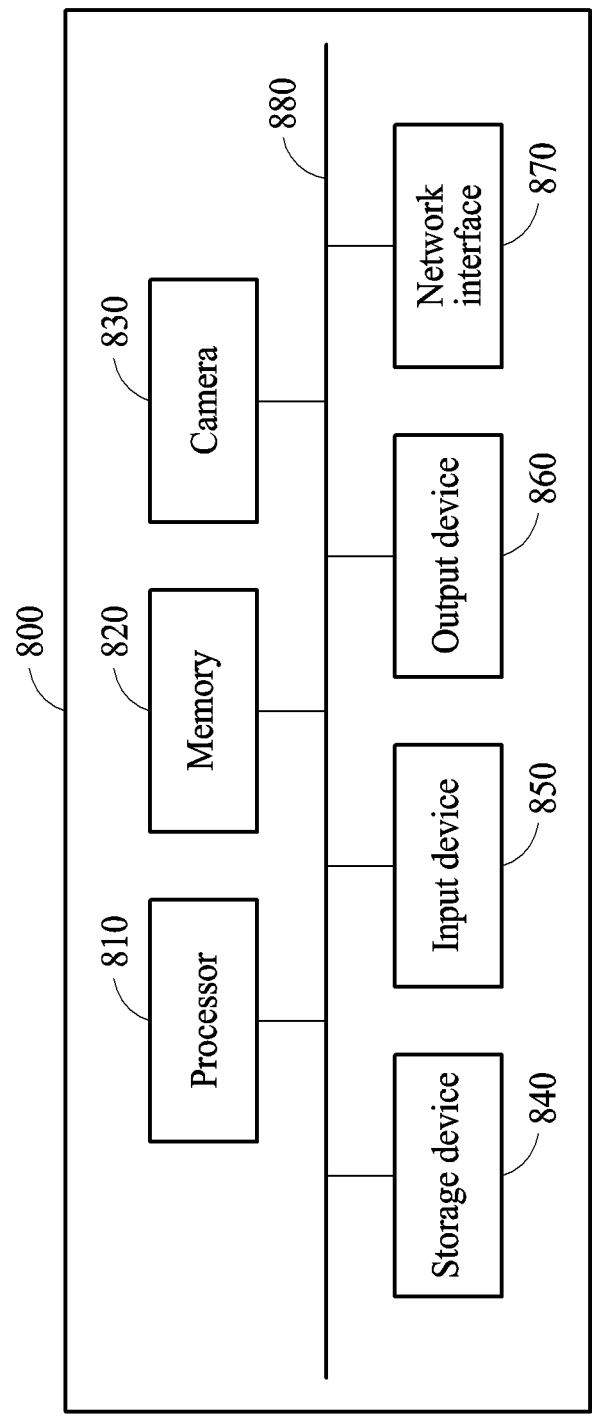
FIG. 8 is a diagram illustrating an example of a computing apparatus.

FIG. 8 is a diagram illustrating an example of a computing apparatus.

A computing apparatus 800 may perform a liveness test on a test target included in an input or captured image, and perform one or more of face recognition, verification, and rejection operations based on a result of the liveness test or based on consideration of the result of the liveness test. As noted above, the computing apparatus 800 may correspond to the computing apparatus 120 illustrated in FIG. 1, the liveness test apparatus 700 illustrated in FIG. 7, and any of the other referenced liveness test apparatuses discussed herein, and thus, may be configured to perform any one or any combination or all operations described herein, noting that embodiments are also not limited thereto.

Referring to FIG. 8, the computing apparatus 800 includes a processor 810, a memory 820, a camera 830, a storage device 840, an input device 850, an output device 860, and a network interface 870. The processor 810, the memory 820, the camera 830, the storage device 840, the input device 850, the output device 860, and the network interface 870 may communicate with one another through a communication bus 880.

The processor 810 may implement functions and instructions to operate in the computing apparatus 800 as described herein. For example, the processor 810 may execute instructions stored in the memory 820 or the storage device 840, the instructions configured to cause the processor 810 to implement one or more, any combination, or all operations described herein with respect to FIGS. 1 through 8. In addition, the processor 810 is configured to control other functions of the computing apparatus 800. For example, the computing apparatus 800 may be mobile device, such as a mobile phone, tablet, or personal computer, and thus the processor 810 is further configured to implement other typical functions of the computing apparatus 800. In an example, the processor 810 may be configured to implement a lock-out operation to only permit a user to access or implement such other typical functions upon a successful verification of the user's captured face image, or may be configured to implement facial recognition or rejection, either in response to sufficiently high, e.g., based on a liveness threshold, liveness image indication by the processor in the implementations of the liveness operations by the processor 810 and/or configured to utilize such liveness image indication by the processor 810 during the facial recognition, verification, or rejection operations by the processor 810. The processor 810 is further configured to acquire parameters of the corresponding liveness test model(s), and, for example, apply those parameters to configure the processor 810 as liveness test neural network(s) or unified liveness test neural network as discussed above, and to implement such liveness test operations using the processor 810 so configured as the liveness test neural network(s) or unified liveness test neural network.

The memory 820 is a non-transitory computer readable media or device that stores information for the liveness test, the facial recognition, verification, and/or rejection operations, e.g., including the example trained parameters defining the liveness test neural network(s) or unified liveness test neural network. In addition, memory 820 is further representative of multiple such types of memory. The memory 820 may include a computer-readable storage medium or a computer-readable storage device. The memory 820 stores instructions to be implemented or executed by the processor 810, and related information during software or applications being executed by the computing apparatus 800.

The camera 830 obtains a still image, a video image, or both including the test target on which the liveness test is to be performed. The processor 810 may control the camera 830 to capture an image, e.g., including a face region, of a user attempting at the face recognition, verification, or rejection, or may control the camera 830 to autonomously capture images and automatically verify a user or target, for example, without user initiation. In addition, the camera 830 may also be controlled by the processor 810 during other functions of the computing apparatus 800, such as when operated as a personal camera.

The storage device 840 may include a computer-readable storage medium or a computer-readable storage device. The storage device 840 may store a database including information, for example, registration features, registered in a face registering process, for the face recognition, verification, or rejection operations. In one example, the storage device 840 may store a greater amount of information compared to the memory 820, and store the information for a long period of time. The storage device 840 may include, for example, a magnetic hard disk, an optical disc, a flash memory, an erasable programmable read-only memory (EPROM), a floppy disk, or other forms of a nonvolatile memory that are well-known in the technical field to which the present disclosure pertains.

The input device 850 receives an input from a user through a tactile, video, audio, or touch input. The input device 850 may include, for example, a keyboard, a mouse, a touch screen, a microphone, or other devices that detect the input from the user and transfer the detected input to the computing apparatus 800.

The output device 860 provides an output of the computing device 800 to the user through a visual, auditory, or tactile channel. The output device 860 may include, for example, a display, a touch screen, a speaker, a vibration generator, or other devices that provide the output to the user. The network interface 870 communicates with an external device through a wired or wireless network. The network interface 870 includes, for example, an Ethernet card, an optical transceiver, a radio frequency transceiver, or another network interface card configured to transmit or receive information. The network interface 870 communicates with an external device using Bluetooth, WiFi, or a third generation (3G), fourth generation (4G), or fifth generation (5G) communication method. The network interface 870 may further include a near field transceiver or the like. For example, through control of the processor 810, and after successful determination of a liveness of a captured image or through use of the liveness determination, and successful identification or verification of a user or target, the near field transceiver may transmit a payment authorization to an external terminal, such as with an appropriate mobile payment instruction transmitted by the near field transceiver. In addition, the processor 810 may control the network interface 870 to routinely check for updates for the registration and/or verification data and for the trained parameters of the liveness test models, e.g., as parameters of respective trained liveness test neural network(s) or a unified liveness test trained neural network, for example, and request, receive, and store such updates in the memory 820 and/or the storage device 840. For example, when the liveness test models are implemented though the above example liveness test neural network(s) or unified liveness test neural network, the processor 810 may request, receive, and store updated weighting matrices for any or all of the liveness test neural network(s) or unified liveness test neural network, as well as any parameters for further neural networks or neural network layers trained to perform the face recognition, verification, or rejection operations. In addition, updated hyperparameters that can control or alter the configurations or architectures of such neural network examples may also be respectively requested, received, and stored along with corresponding weighting matrices in any of the memory 820 or storage device 840.

The liveness test apparatuses, computing apparatus 120, camera 130, display 125, first liveness test models 340, second liveness test models 350, third liveness test models 360, liveness determiner 370, liveness test model 380, liveness determiner 390, conditional weight determiner 610, liveness determiner 620, liveness test apparatus 700, processor 710, memory 720, computing apparatus 800, processor 810, memory 820, camera 830, storage device 840, input device 850, output device 860, and network device 870 in FIGS. 1-8 and that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented liveness test method, the method comprising:
   detecting a face region in an input image for a test target;
   implementing a first liveness test to determine a first liveness value based on a first image corresponding to the detected face region;
   implementing a second liveness test to determine a second liveness value based on a second image corresponding to a partial face region of the detected face region;
   implementing a third liveness test to determine a third liveness value based on an entirety of the input image or a full region of the input image that includes the detected face region and a region beyond the detected face region; and determining a result of the liveness test based on the first liveness value, the second liveness value, and the third liveness value.

2. The method of claim 1,
wherein the first liveness value is based on extracted face shape information, extracted in the first liveness test, from the first image,
wherein the second liveness value is based on extracted texture information, extracted in the second liveness test, from the second image, and
wherein the third liveness value is based on extracted context information, extracted in the third liveness test, from the input image or the full region of the input image.

3. The method of claim 1, wherein the determining of the result of the liveness test comprises:
determining a final liveness value based on the first liveness value, the second liveness value, and the third liveness value; and
determining whether the test target is live based on whether the final liveness value satisfies a preset condition.

4. The method of claim 3, wherein the determining of the final liveness value comprises:
applying respective weights to any one or any combination of any two or more of the first liveness value, the second liveness value, and the third liveness value, and determining the final liveness value based on a result of the applying.

5. The method of claim 4, wherein the respective weights are determined based on any one or any combination of any two or more of a determined size of the detected face region, a determined facial pose depicted in the input image, a determined location of a face in the input image, a determined presence or absence of an occluded region in the detected face region, and a determined illumination state of the detected face region.

6. The method of claim 5, wherein the respective weights are based on respective predetermined functions that differently consider one or more of the determined size of the detected face region, the determined facial pose depicted in the input image, the determined location of the face in the input image, the determined presence or absence of the occluded region in the detected face region, and the determined illumination state of the detected face region.

7. The method of claim 3, wherein the determining of the final liveness value comprises any one or any combination of any two or more of:
in response to the first liveness value being determined to be less than a first threshold value, applying a first weight to the first liveness value and performing the determining of the result of the liveness test based on the applying of the first weight to the first liveness value;
in response to the second liveness value being determined to be less than a second threshold value, applying a second weight to the second liveness value and performing the determining of the result of the liveness test based on the applying of the second weight to the second liveness value; and
in response to the third liveness value being determined to be less than a third threshold value, applying a third weight to the third liveness value and performing the determining of the result of the liveness test based on the applying of the third weight to the third liveness value.

8. The method of claim 1,
wherein the first liveness value is determined by the first liveness test being implemented by a first liveness test model,
the second liveness value is determined by the second liveness test being implemented by a second liveness test model, and
the third liveness value is determined by the third liveness test being implemented by a third liveness test model.

9. The method of claim 1, the method further comprising implementing a single liveness test model to perform the first liveness test, the second liveness test, and the third liveness test.

10. The method of claim 9, wherein image information of the first image, image information of the second image, and image information of the input image or the full region of the input image are input to at least one input layer of the liveness test model, and the first liveness value, the second liveness value, and the third liveness value are output from at least one output layer of the liveness test model.

11. The method of claim 1, further comprising:
selectively implementing any one or any combination of any two or more of the first liveness test, the second liveness test, and the second liveness test.

12. The method of claim 11, wherein the selective implementing includes, in response to a size of the detected face region being determined to be less than a threshold face region size, determining not to implement the any one or any combination of any two or more of the first liveness test, the second liveness test, and the second liveness test.

13. The method of claim 1, further comprising:
normalizing the first image; and
implementing the first liveness test by determining the first liveness value from image information of the normalized first image using a first liveness test model.

14. The method of claim 1, further comprising:
obtaining the second image by cropping the partial face region from the detected face region; and
implementing the second liveness test by determining the second liveness value from image information of the second image using a second liveness test model.

15. The method of claim 14, wherein the obtaining of the second image includes randomly determining a region to be cropped within the detected face region and performing the cropping with respect to the determined region to be cropped.

16. The method of claim 1, further comprising:
normalizing the input image or the full region of the input image; and
implementing the third liveness test by determining the third liveness value from image information of the normalized input image using a third liveness test model.

17. The method of claim 1,
wherein the determining of the first liveness value is performed using a trained first liveness test model, the first liveness test model being trained to extract face shape information from an input face region and to determine the first liveness value based on the extracted face shape information,
wherein the determining of the second liveness value is performed using a trained second liveness test model, the second liveness test model being trained to extract texture information from an input partial face region, and wherein the determining of the third liveness value is performed using a trained third liveness test model, the third liveness test model being trained to extract context information from an input face included image.

18. The method of claim 17, wherein the first liveness test model is trained to extract features representing any one or any combination of a light reflection and shape distortion that occurs due to respective bent or wrinkled portions of one or more spoofing materials.

19. The method of claim 17, wherein the second liveness test model is trained to extract features representing fine texture differences between human skin and one or more potential materials.

20. The method of claim 17, wherein the third liveness test model is trained to extract features indicating any one or any combination of a depth of a spoofing material and an object or human extremity holding the spoofing material.

21. A non-transitory computer-readable storage medium storing instructions, which when executed by computing hardware, cause the computing hardware to perform the liveness test method of claim 1.

22. A processor implemented liveness test method, the method comprising:
   detecting a face region from an input image for a test target;
   implementing a first liveness test to determine a first liveness value based on a first image corresponding to the detected face region;
   implementing a second liveness test to determine a second liveness value based on a second image corresponding to a partial face region of the detected face region;
   implementing a third liveness test to determine a third liveness value based on an entirety of the input image or a full region of the input image that includes the detected face region and a region beyond the detected face region; and
   determining a result of the liveness test based on any one or any combination of any two or more of the first liveness value, the second liveness value, and the third liveness value.

23. The method of claim 22, wherein the determining of the result of the liveness test comprises:
   determining a final liveness value based on any one or any combination of any two or more of the first liveness value, the second liveness value, and the third liveness value; and
   determining whether the test target is live based on whether the final liveness value satisfies a preset condition.

24. The method of claim 22, wherein
   the first liveness value is determined by the first liveness test being implemented by a first liveness test model,
   the second liveness value is determined by the second liveness test being implemented by a second liveness test model, and
   the third liveness value is determined by the third liveness test being implemented by a third liveness test model.

25. A liveness test apparatus to perform a liveness test on a test target, the liveness test apparatus comprising:
   a processor configured to:
   detect a face region from an input image;
   implement a first liveness test to determine a first liveness value based on a first image corresponding to the detected face region;
   implement a second liveness test to determine a second liveness value based on a second image corresponding to a partial face region of the detected face region;
   implement a third liveness test to determine a third liveness value based on an entirety of the input image or a full region of the input image that includes the detected face region and a region beyond the detected face region; and
   determine a result of the liveness test based on the first liveness value, the second liveness value, and the third liveness value.

26. The liveness test apparatus of claim 25, wherein the processor is configured to determine a final liveness value based on the first liveness value, the second liveness value, and the third liveness value, and
   determine whether the test target is live based on whether the final liveness value satisfies a preset condition.

27. The liveness test apparatus of claim 26, wherein the processor is configured to apply respective weights to any one or any combination of any two or more of the first liveness value, the second liveness value, and the third liveness value, and determine the final liveness value based on a result of the applying.

28. A liveness test apparatus to perform a liveness test on a test target, the liveness test apparatus comprising:
   a processor configured to:
   implement a trained first liveness test model input a first image corresponding to a detected face region of an input image, the first liveness test model being trained to extract face shape information from an input face region and to determine a first liveness value based on the extracted face shape information;
   implement a trained second liveness test model input a second image corresponding to a partial face region of the detected face region, the second liveness test model being trained to extract texture information from an input partial face region and to determine a second liveness value based on the extracted texture information;
   implement a trained third liveness test model input an entirety of the input image or a full region of the input image that includes the detected face region and a region beyond the detected face region, the third liveness test model being trained to extract context information from an input face included image and to determine a third liveness value based on the extracted context information; and
   determine a liveness of the input image based on the first liveness value as determined by the first liveness test model, the second liveness value as determined by the second liveness test model, and the third liveness value as determined by the third liveness test model.

29. The apparatus of claim 28, wherein the first liveness test model is trained to extract features representing any one or any combination of a light reflection and shape distortion that occurs due to respective bent or wrinkled portions of one or more spoofing materials.

30. The apparatus of claim 28, wherein the second liveness test model is trained to extract features representing fine texture differences between human skin and one or more spoofing materials.

31. The apparatus of claim 28, wherein the third liveness test model is trained to extract features indicating a depth of a spoofing material and/or an object or human extremity holding the spoofing material.

32. The apparatus of claim 28, further comprising:
a first weight determiner configured to selectively determine respective first weights to be applied to one or more of the first liveness value, the second liveness value, and the third liveness value based on respective determinations of whether the first liveness value, the second liveness value, and the third liveness value meet respective first, second, and third liveness thresholds; and
a second weight determiner configured to selectively determine respective second weights to be applied to one or more of the first liveness value, the second liveness value, and the third liveness value based on one or more determined conditions regarding the detected face region,
wherein, dependent on the selective determination of the respective first weights and the selective determination of the respective second weights, the determining of the liveness of the input image is
 based on the first weight to be applied to the first liveness value being applied to the first liveness value and/or the second weight to be applied to the first liveness value being applied to the first liveness value,
 based on the first weight to be applied to the second liveness value being applied to the second liveness value and/or the second weight to be applied to the second liveness value being applied to the second liveness value, and
 based on the first weight to be applied to the third liveness value being applied to the third liveness value and/or the second weight to be applied to the third liveness value being applied to the third liveness value,
 to determine a final liveness value which the liveness of the input image is based on.

33. The apparatus of claim 32, wherein the one or more determined conditions regarding the detected face region include a determined distance to the test target, a determined image quality, a determined size of the detected face region, a determined facial pose depicted in the input image, a determined location of the detected face region in the input image, a determined presence or absence of an occluded region in the detected face region, and a determined illumination state of the detected face region.

34. The apparatus of claim 28, further comprising a memory comprising respective trained parameters of first liveness test model, the second liveness test model, and the third liveness test model,
 wherein first liveness test model, the second liveness test model, and the third liveness test model are respective one or more neural network layers, and
 wherein the processor is further configured to be a unified neural network by implementing the respective trained parameters to generate the respective one or more neural network layers in the unified neural network.

35. The apparatus of claim 34, wherein the unified neural network further comprises one or more further neural network layers trained to perform the determining of the liveness of the input image based on the first liveness value, the second liveness value, and the third liveness value, as provided to the one or more further neural network layers.

36. The apparatus of claim 34, wherein two of the first liveness test model, the second liveness test model, and the third liveness test model are configured to be implemented in parallel and two of the first liveness test model, the second liveness test model, and the third liveness test model are configured to be implemented in serial.

37. The apparatus of claim 34, wherein the first liveness test model, the second liveness test model, and the third liveness test model are configured to be implemented in parallel, with each of the first image, the second image, and the entirety of the input image or the full region of the input image being input to corresponding separate input layers of the unified neural network.

* * * * *